(12) United States Patent
Mock

(10) Patent No.: US 9,671,927 B2
(45) Date of Patent: *Jun. 6, 2017

(54) SELECTING AN OPTION BASED ON CONTEXT AFTER WAKING FROM SLEEP

(71) Applicant: Lifesize, Inc., Austin, TX (US)

(72) Inventor: Wayne E. Mock, Round Rock, TX (US)

(73) Assignee: Lifesize, Inc., Austin, TX (US)

(*) Notice: Subject to any disclaimer, the term of this patent is extended or adjusted under 35 U.S.C. 154(b) by 207 days.

This patent is subject to a terminal disclaimer.

(21) Appl. No.: 14/534,406

(22) Filed: Nov. 6, 2014

(65) Prior Publication Data

US 2015/0067544 A1  Mar. 5, 2015

Related U.S. Application Data

(63) Continuation of application No. 13/451,907, filed on Apr. 20, 2012, now Pat. No. 8,928,726.

(51) Int. Cl.
| | |
|---|---|
| *H04N 7/15* | (2006.01) |
| *G06F 3/0481* | (2013.01) |
| *G06F 3/0484* | (2013.01) |
| *H04L 29/06* | (2006.01) |
| *H04M 3/56* | (2006.01) |
| *H04L 12/18* | (2006.01) |

(52) U.S. Cl.
CPC ...... *G06F 3/04817* (2013.01); *G06F 3/04842* (2013.01); *H04L 65/403* (2013.01); *H04N 7/152* (2013.01); *H04L 12/1818* (2013.01); *H04M 3/567* (2013.01)

(58) Field of Classification Search
CPC combination set(s) only.
See application file for complete search history.

(56) References Cited

U.S. PATENT DOCUMENTS

| | | | |
|---|---|---|---|
| 5,583,560 A | 12/1996 | Florin | |
| 5,594,509 A | 1/1997 | Florin | |
| 5,621,456 A | 4/1997 | Florin | |
| 7,120,433 B2 | 10/2006 | Gladwin | |
| 7,248,150 B2 | 7/2007 | Mackjust | |
| 7,290,274 B1 | 10/2007 | Banker | |

(Continued)

*Primary Examiner* — Joseph J Nguyen
(74) *Attorney, Agent, or Firm* — Meyertons, Hood, Kivlin, Goetzel, P.C.

(57) ABSTRACT

System and method involving user interfaces and remote control devices. More specifically, these user interfaces may be particularly useful for providing an intuitive and user friendly interaction between a user and a device or application using a display, e.g., at a "10 foot" interaction level. The user interfaces may be specifically designed for interaction using a simple remote control device having a limited number of inputs. For example, the simple remote control may include directional inputs (e.g., up, down, left, right), a confirmation input (e.g., ok), and possibly a mute input. The user interface may be customized based on current user activity or other contexts (e.g., based on current or previous states), the user logging in (e.g., using a communication device), etc. Additionally, the user interface may allow the user to adjust cameras whose video are not currently displayed, rejoin previously left videoconferences, and/or any of a variety of desirable actions.

20 Claims, 35 Drawing Sheets

(56) References Cited

U.S. PATENT DOCUMENTS

| | | |
|---|---|---|
| 7,499,003 B2 | 3/2009 | Rudolph |
| 7,539,472 B2 | 5/2009 | Sloo |
| 7,577,917 B2 | 8/2009 | Vong |
| 7,607,107 B2 | 10/2009 | Iten |
| 7,610,279 B2 | 10/2009 | Budzik |
| 7,692,683 B2 | 4/2010 | Kenoyer |
| 7,716,603 B2 | 5/2010 | Boyden |
| 7,743,116 B2 | 6/2010 | Goldeen |
| 8,064,972 B2 | 11/2011 | McLoone |
| 8,082,507 B2 | 12/2011 | Speicher |
| 8,146,003 B2 | 3/2012 | Gruen |
| 8,150,450 B1 | 4/2012 | Wengrovitz |
| 8,237,765 B2 | 8/2012 | King |
| 8,301,916 B2 | 10/2012 | Hamilton |
| 8,456,453 B2 | 6/2013 | Bi |
| 8,560,020 B2 | 10/2013 | Lee |
| 2001/0049087 A1 | 12/2001 | Hale |
| 2002/0008693 A1 | 1/2002 | Banerjee |
| 2004/0119756 A1* | 6/2004 | Kumhyr ................ G06F 9/4443 715/837 |
| 2004/0119757 A1* | 6/2004 | Corley ................ G06F 3/04817 715/837 |
| 2006/0259552 A1 | 11/2006 | Mock |
| 2007/0204273 A1 | 8/2007 | Chen |
| 2007/0236472 A1 | 10/2007 | Bentsen |
| 2008/0109763 A1 | 5/2008 | Lee |
| 2008/0254839 A1* | 10/2008 | Lee ....................... G06F 3/0412 455/566 |
| 2008/0316295 A1 | 12/2008 | King |
| 2010/0188473 A1 | 7/2010 | King |
| 2010/0217806 A1 | 8/2010 | Khot |
| 2010/0293469 A1 | 11/2010 | Khot |
| 2010/0315483 A1 | 12/2010 | King |
| 2011/0098019 A1 | 4/2011 | Fujii |
| 2011/0261148 A1 | 10/2011 | Goyal |
| 2011/0279631 A1 | 11/2011 | Ranganath |
| 2012/0021703 A1 | 1/2012 | Yamazaki |
| 2013/0002799 A1 | 1/2013 | Mock |
| 2013/0154923 A1 | 6/2013 | Mock |

* cited by examiner

SELECTING AN OPTION BASED ON CONTEXT AFTER WAKING FROM SLEEP

PRIORITY CLAIM

This application is a continuation of Ser. No. 13/451,907 titled "Videoconferencing System with Context Sensitive Wake Features" and filed Apr. 20, 2012, whose inventor was Wayne E. Mock and which is hereby incorporated by reference in its entirety as though fully and completely set forth herein.

FIELD OF THE INVENTION

The present invention relates generally to user interfaces and, more specifically, to a user interface for a display using a simple remote control.

DESCRIPTION OF THE RELATED ART

In recent years, various devices which operate using a display have proliferated, particularly those associated with larger displays, e.g., for entertainment or videoconferencing. For example, there are currently many different types of gaming consoles, set top units, digital video recorders (DVRs), cable boxes, videoconferencing units, etc., all of which provide video signals to a video display, e.g., within a living room or conferencing room. Typically, these devices ship with remote control devices that are overly complex and frustrating to users. For example, current videoconferencing units often have associated remote control devices where individual buttons have overloaded functionality that is not apparent or ergonomic to a lay user. Accordingly, the user is often forced to look between the presented user interface on the display and the buttons on the remote control device multiple times to perform even simple tasks.

Thus, improvements in interactions between users and user interfaces are desired.

SUMMARY OF THE INVENTION

Various embodiments are presented of a system and method for user interfaces using remote control devices. More specifically, these user interfaces may be particularly useful for providing an intuitive and user friendly interaction between a user and a device or application using a display, e.g., at a "10 foot" interaction level.

In some embodiments, the user interfaces may be specifically designed for interaction using a simple remote control device. A "simple remote control device" may have a limited number of inputs and may be usable by the user without requiring the user to look at the remote control device during use. For example, the simple remote control device may have fewer than 8 inputs (e.g., 6 inputs). In one specific embodiment, the simple remote control may include directional inputs (e.g., up, down, left, right), a confirmation input (e.g., ok), and possibly a mute input.

Accordingly, the user interfaces may be designed with the simple remote control device in mind, thereby allowing a user to quickly and intuitively interact with the device or application without having to understand the functions provided by a complex remote control having overloaded functionality, as is typical in current systems.

As discussed below, these user interfaces may allow a user to customize the system or user interface, rejoin previously left or abandoned activities (e.g., videoconferences), and/or perform camera control (e.g., whose video are not currently displayed), among other possibilities. Additionally, the user interface may be adaptive or may provide features or contexts which are based on current activities (e.g., videoconferences, viewing videos, etc.), previous activities (e.g., when waking from a sleep state, rejoining the previous activities, etc.), previous positions in the user interface, etc.

The embodiments discussed herein may generally be usable for any user interfaces provided on displays, particularly those presented on larger displays that is not immediately proximate to the user (e.g., for displays 10 feet away). These user interfaces may be used for set top boxes (e.g., for watching television shows, movies, sports, etc.), gaming consoles, videoconferencing devices, home theatre PCs (HTPCs) or associated applications executing on the HTPCs, etc.

BRIEF DESCRIPTION OF THE DRAWINGS

A better understanding of the present invention may be obtained when the following detailed description is considered in conjunction with the following drawings, in which.

Figure 1:
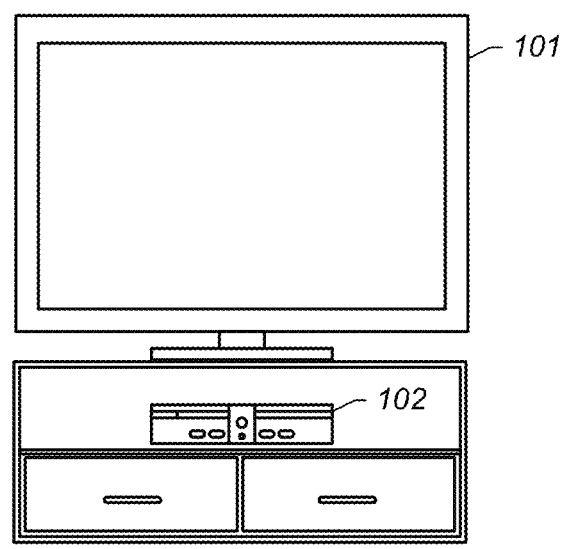
FIGS. 1 and 2 illustrate exemplary systems, according to various embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include", and derivations thereof, mean "including, but not limited to". The term "coupled" means "directly or indirectly connected".

DETAILED DESCRIPTION OF THE EMBODIMENTS

Incorporation by Reference

U.S. patent application titled "Video Conferencing System Transcoder", Ser. No. 11/252,238, which was filed Oct. 17, 2005, whose inventors are Michael L. Kenoyer and Michael V. Jenkins, is hereby incorporated by reference in its entirety as though fully and completely set forth herein.

U.S. patent application titled "Virtual Decoders", Ser. No. 12/142,263, which was filed Jun. 19, 2008, whose inventors are Keith C. King and Wayne E. Mock, is hereby incorporated by reference in its entirety as though fully and completely set forth herein.

U.S. patent application titled "Video Conferencing Device which Performs Multi-way Conferencing", Ser. No. 12/142,340, whose inventors are Keith C. King and Wayne E. Mock, is hereby incorporated by reference in its entirety as though fully and completely set forth herein.

U.S. patent application titled "Conferencing System Utilizing a Mobile Communication Device as an Interface", Ser. No. 12/692,915, whose inventors are Keith C. King and Matthew K. Brandt, is hereby incorporated by reference in its entirety as though fully and completely set forth herein.

U.S. patent application titled "Controlling a Videoconference Based on Context of Touch-Based Gestures", Ser. No. 13/171,292, which was filed on Jun. 28, 2011, whose inventor is Wayne E. Mock is hereby incorporated by reference in its entirety as though fully and completely set forth herein.

U.S. patent application titled "Performing Searching for a List of Entries Using a Remote Control Device", Ser. No. 13/327,904, which was filed on Dec. 16, 2011, whose inventor is Wayne E. Mock U.S. patent application titled "Automatically Customizing a Conferencing System Based on Proximity of a Participant", Ser. No. 13/194,655, which was filed Sep. 29, 2011, whose inventors are Prithvi Ranganath, Raghuram Belur, Sandeep Lakshmipathy, Ashish Goyal, and Binu Kaiparambil Shanmukhadas is hereby incorporated by reference in its entirety as though fully and completely set forth herein.

U.S. patent application Ser. No. 13/093,948, titled "Recording a Videoconference Based on Recording Configurations", filed Apr. 26, 2011, whose inventors are Ashish Goyal and Binu Kaiparambil Shanmukhadas.

U.S. patent application Ser. No. 12/724,226, titled "Automatic Conferencing Based on Participant Presence", filed on Mar. 15, 2010, whose inventor is Keith C. King, is hereby incorporated by reference in its entirety as though fully and completely set forth herein.

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), smart phone, television system, grid computing system, or other device or combinations of devices. In general, the term "computer system" can be broadly defined to encompass any device (or combination of devices) having at least one processor that executes instructions from a memory medium.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—Exemplary Entertainment System

FIG. 1 illustrates an exemplary embodiment of an entertainment system, e.g., for use in a user's living room. As shown, a display 101 may be used to display video of various devices or components, such as device 102. The device 102 may be any of various devices, e.g., gaming consoles (such as Xbox™ provided by Microsoft, Playstation™ provided by Sony, Wii™ provided by Nintendo, etc.), computer systems (e.g., HTPCs), digital video recorders (DVRs), streaming devices, cable or satellite devices (e.g., for viewing cable or satellite programming), set top boxes, videoconferencing devices, etc. The device 102 may include logic (e.g., processor(s) and memory medium(s) storing program instructions, and/or circuitry) for providing video signals to the display 101 for interaction by the user. The device 102 may be configured to provide various user interfaces for interaction by a remote control device on the display, as described herein.

Typically, the device 102 may be configured to perform a dedicated function. For example, a videoconferencing device's dedicated functionality may be to perform videoconferencing. Similarly, a gaming console's dedicated functionality may be to execute games. Accordingly, in some embodiments, the user interfaces described herein may be separate from the dedicated functionality. For example, in the case of a videoconference, various user interfaces may be presented for configuring the device or initiating/setting up videoconferences as opposed to actually performing the videoconference. Similarly, gaming consoles may have various user interfaces which are provided outside of the context of playing games (e.g., for social functions, set up, purchasing, etc.). As another example, a set top box may be provided for providing content and may have a user interface for selecting among a variety of content choices. Thus, in this example, the dedicated functionality may be providing the content and the user interfaces may be external to that dedicated functionality (although it may be used to select the content to be viewed).

In some embodiments, the display may include logic for performing any of the functionality described above. For example, the display may include a processor and memory medium for providing user interfaces as discussed herein, as well as any dedicated functionality described above. Further types of user interfaces, dedicated functionality, devices, etc. are envisioned.

Additionally, note that more than one device 102 may be coupled to the display. For example, each device may provide its own video signals to the display and the user may choose which of the device's video signals to display. Further, other devices may also be included, such as a receiver and speakers, video camera, etc.

Figure 2:
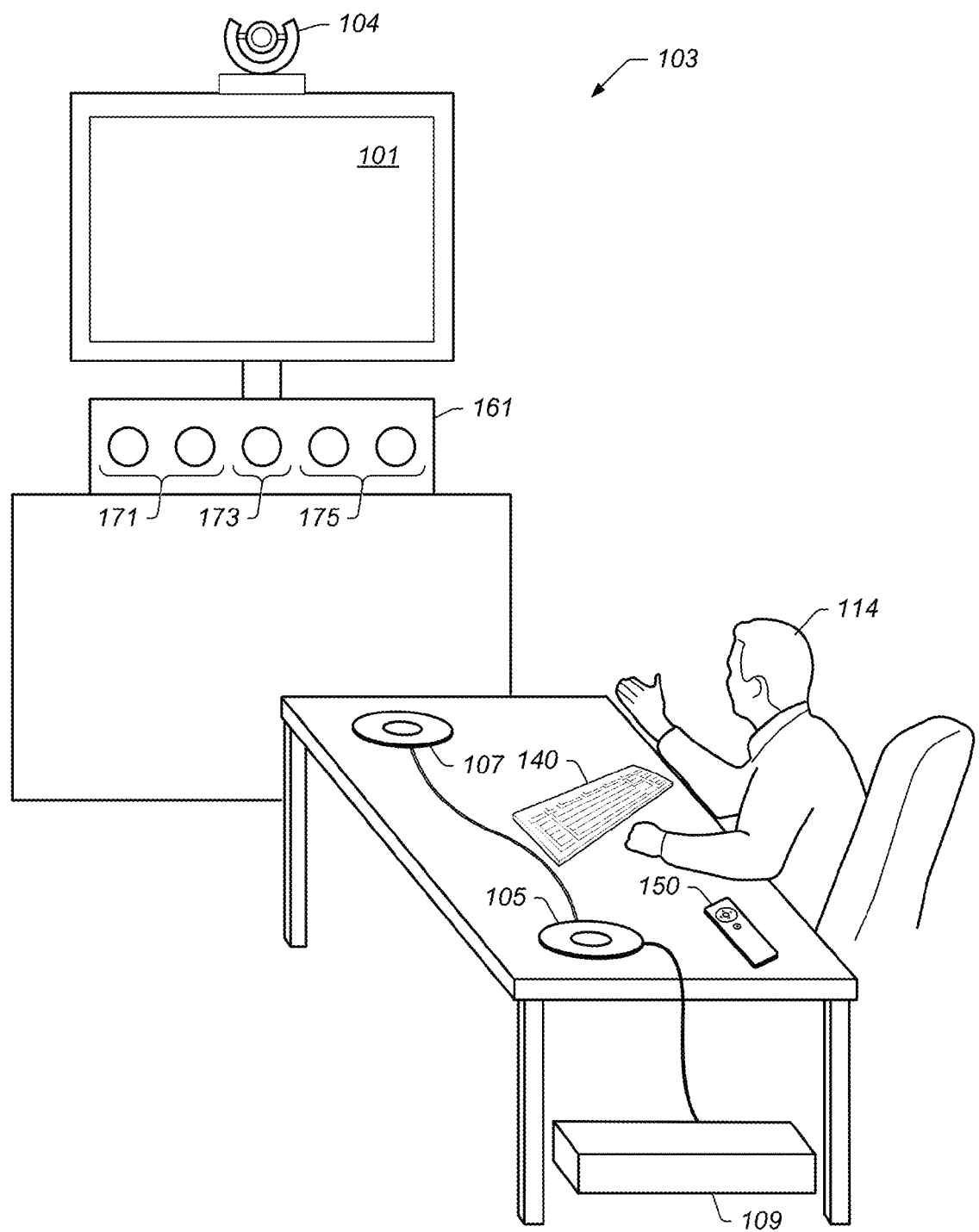

FIG. 2—Exemplary Videoconferencing Participant Location

FIG. 2 illustrates an exemplary embodiment of a videoconferencing participant location, also referred to as a videoconferencing endpoint or videoconferencing system. The videoconferencing unit may be configured to perform embodiments described herein, such as the provision of various user interfaces. The videoconferencing system 103 may have a system codec (or videoconferencing unit) 109 to manage both a speakerphone 105/107 and videoconferencing hardware, e.g., camera 104, display 101, speakers 171, 173, 175, etc. The speakerphones 105/107 and other videoconferencing system components may be coupled to the codec 109 and may receive audio and/or video signals from the system codec 109.

In some embodiments, the participant location may include camera 104 (e.g., an HD camera) for acquiring images (e.g., of participant 114) of the participant location. Other cameras are also contemplated. The participant location may also include display 101 (e.g., an HDTV display). Images acquired by the camera 104 may be displayed locally on the display 101 and/or may be encoded and transmitted to other participant locations in the videoconference. In some embodiments, images acquired by the camera 104 may be encoded and transmitted to a multipoint control unit (MCU), which then provides the encoded stream to other participant locations (or videoconferencing endpoints).

The participant location may further include one or more input devices, such as the computer keyboard 140. In some embodiments, the one or more input devices may be used for the videoconferencing system 103 and/or may be used for one or more other computer systems at the participant location, as desired.

The participant location may also include a sound system 161. The sound system 161 may include multiple speakers including left speakers 171, center speaker 173, and right speakers 175. Other numbers of speakers and other speaker configurations may also be used. The videoconferencing system 103 may also use one or more speakerphones 105/107 which may be daisy chained together.

Figure 3:
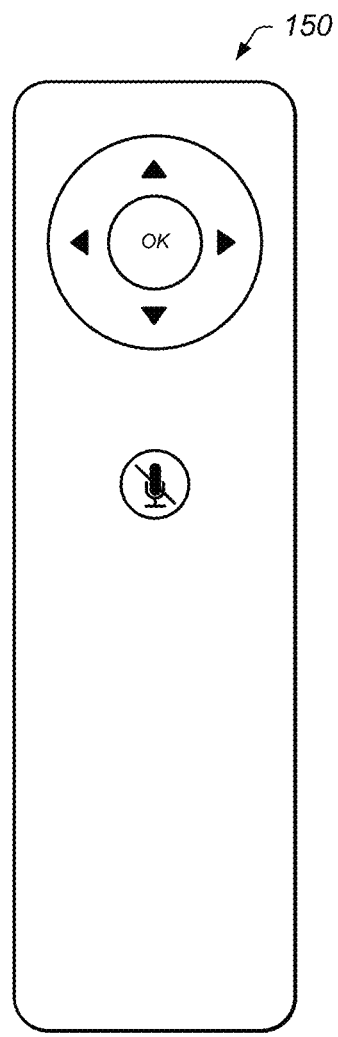
FIG. 3 illustrates an exemplary simple remote control device for interacting with user interfaces, according to an embodiment.

In some embodiments, the videoconferencing system components (e.g., the camera 104, display 101, sound system 161, and speakerphones 105/107) may be coupled to a system codec 109. The system codec 109 may be placed on a desk or on the floor. Other placements are also contemplated. The system codec 109 may receive audio and/or video data from a network, such as a LAN (local area network) or the Internet. The system codec 109 may send the audio to the speakerphone 105/107 and/or sound system 161 and the video to the display 101. The received video may be HD video that is displayed on the HD display. The system codec 109 may also receive video data from the camera 104 and audio data from the speakerphones 105/107 and transmit the video and/or audio data over the network to another conferencing system, or to an MCU for provision to other conferencing systems. The conferencing system may be controlled by a participant or user through various mechanisms, such as a remote control device, described herein. The remote control device may be implemented with a plurality of inputs, such as physical buttons and/or with a touch interface. In some embodiments, the remote control device may be implemented as a portion of other videoconferencing devices, such as the speakerphones 107 and/or 105, and/or as a separate device. FIG. 3 provides an exemplary embodiment of simple remote control device.

In various embodiments, the codec 109 may implement a real time transmission protocol. In some embodiments, the codec 109 (which may be short for "compressor/decompressor" or "coder/decoder") may comprise any system and/or method for encoding and/or decoding (e.g., compressing and decompressing) data (e.g., audio and/or video data). For example, communication applications may use codecs for encoding video and audio for transmission across networks, including compression and packetization. Codecs may also be used to convert an analog signal to a digital signal for transmitting over various digital networks (e.g., network, PSTN, the Internet, etc.) and to convert a received digital signal to an analog signal. In various embodiments, codecs may be implemented in software, hardware, or a combination of both. Some codecs for computer video and/or audio may utilize MPEG, Indeo™, and Cinepak™, among others.

In some embodiments, the videoconferencing system 103 may be designed to operate with normal display or high definition (HD) display capabilities. The videoconferencing system 103 may operate with network infrastructures that support T1 capabilities or less, e.g., 1.5 mega-bits per second or less in one embodiment, and 2 mega-bits per second in other embodiments.

Note that the videoconferencing system(s) described herein may be dedicated videoconferencing systems (i.e., whose purpose is to provide videoconferencing) or general purpose computers (e.g., IBM-compatible PC, Mac, etc.) executing videoconferencing software (e.g., a general purpose computer for using user applications, one of which performs videoconferencing). A dedicated videoconferencing system may be designed specifically for videoconferencing, and is not used as a general purpose computing platform; for example, the dedicated videoconferencing system may execute an operating system which may be typically streamlined (or "locked down") to run one or more applications to provide videoconferencing, e.g., for a conference room of a company. In other embodiments, the videoconferencing system may be a general use computer (e.g., a typical computer system which may be used by the general public or a high end computer system used by corporations) which can execute a plurality of third party applications, one of which provides videoconferencing capabilities. Videoconferencing systems may be complex (such as the videoconferencing system shown in FIG. 1) or simple (e.g., a user computer system with a video camera, input devices, microphone and/or speakers). Thus, references to videoconferencing systems, endpoints, etc. herein may refer to general computer systems which execute videoconferencing applications or dedicated videoconferencing systems. Note further that references to the videoconferencing systems performing actions may refer to the videoconferencing application(s) executed by the videoconferencing systems performing the actions (i.e., being executed to perform the actions).

As described herein, the videoconferencing system 103 may execute various videoconferencing application software that presents a graphical user interface (GUI) on the display 101. The GUI may be used to present an address book, contact list, list of previous callees (call list) and/or other information indicating other videoconferencing systems that the user may desire to call to conduct a videoconference. The GUI may also present options for recording a current videoconference, and may also present options for viewing a previously recorded videoconference.

Note that the videoconferencing system shown in FIG. 2 may be modified to be an audioconferencing system. For example, the audioconference could be performed over a network, e.g., the Internet, using VOIP. Additionally, note that any reference to a "conferencing system" or "conferencing systems" may refer to videoconferencing systems or audioconferencing systems (e.g., teleconferencing systems). In the embodiments described below, the conference is described as a videoconference, but note that the methods may be modified for utilization in an audioconference.

When performing a videoconference, the various videoconferencing systems may be coupled in a variety of manners. For example, the videoconferencing systems may be coupled over wide area networks (e.g., such as the Internet) and/or local area networks (LANs). The networks may be wired or wireless as desired. During a videoconference, various ones of the videoconferencing units may be coupled using disparate networks. For example, two of the videoconferencing systems may be coupled over a LAN while others of the videoconference are coupled over a wide area network. Additionally, the communication links between the videoconferencing units may be implemented in a variety of manners, such as those described in the patent applications incorporated by reference above.

FIG. 3—Exemplary Remote Control Device

FIG. 3 illustrates an exemplary remote control device 150 which may be used to implement various embodiments described herein. In this particular example, the remote control device 150 is a simple remote control device having relatively few inputs. As shown, the remote control device 150 includes directional inputs (up, down, left, right), a confirmation input (ok), and a mute input. Note that these inputs may be implemented as physical buttons, in a touch interface (e.g., with haptic or other physical feedback and/or physical features indicating the locations of the inputs), or in any other desirable manner. Generally, the simple remote control device 150 may be implemented in a manner that allows the user to use the remote control device 150 without having to look at the remote control device 150. More specifically, the remote control device 150 may be implemented such that a user may look at the remote control device 150 and begin to use the remote control device 150 without requiring further analysis of inputs or layout (e.g., due to its simplicity). This design may allow the user to visually focus only on the display 101 rather than dividing visual focus between the display 101 and the remote control device 150. Accordingly, in conjunction with a properly designed user interface may lead to a more efficient and pleasant user experience.

While only six inputs are shown in FIG. 3, more or fewer inputs may be used. For example, an additional menu input (e.g., for accessing or clearing menus), power input (e.g., for turning a device on or off), etc. may be added. However, while additional inputs are contemplated, for a simple remote control device, fewer than 8 or 10 inputs may be desired so that the user can easily remember the location and purpose of each input without requiring visual analysis. Simple remote control devices may typically avoid having dedicated alphanumeric inputs. More complex remote control devices are also envisioned (e.g., having more than 8 or 10 inputs), but design must be carefully implemented in order to overcome the typical deficiencies of complex remotes noted above.

Additionally, while the remote 150 may be particularly devoted to embodiments concerning videoconferencing (e.g., where a mute input is generally desirable) other features may be more desirable for other types of devices or applications. For example, the mute input may be replaced by a menu input, a power on/off input, or may simply be removed, among other possibilities.

Following Descriptions

The following Figures and paragraphs describe various embodiments of user interfaces that may be used with the systems of FIGS. 1 and 2 as well as the remote control device of FIG. 3, although variations are envisioned. In one embodiment, these user interfaces may be used together within a larger user interface or menu system, such as shown in the exemplary user interface Figures. In the below, an embodiment of a user interface (e.g., a feature of the menu system) may be described followed by descriptions of Figures showing an example of such a user interface. These user interfaces are only provided as examples of the described methods and are not intended to be limiting.

Figure 4:
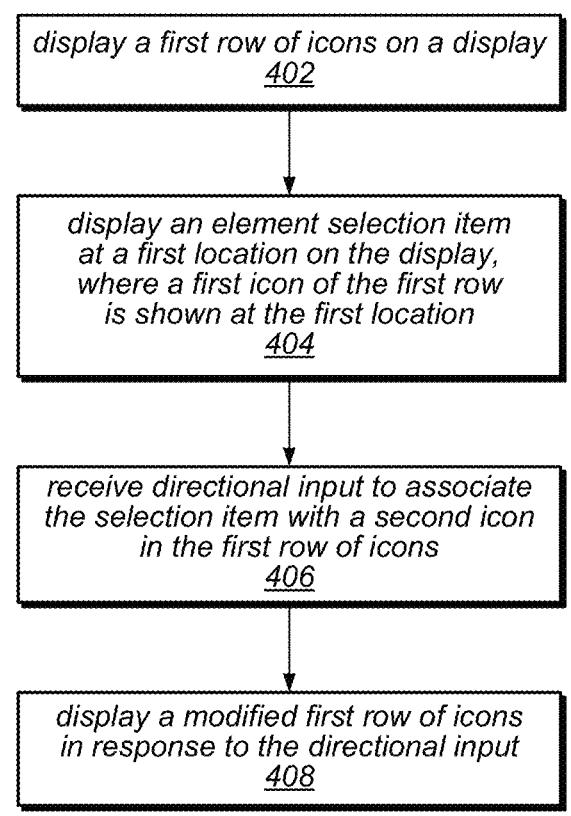
FIGS. 4 and 5 are flowchart diagrams illustrating embodiments of a method for providing a user interface for a simple remote control device.

FIG. 4—Providing a User Interface for a Simple Remote Control Device

FIG. 4 illustrates an embodiment of a method for providing a user interface having multiple items in a row. The method shown in FIG. 4 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 402, a first row of items (e.g., icons) may be displayed on a display. For example, the first row of items may be displayed as a horizontal row in a top portion of the display. However, in alternate embodiments, the row may be a vertical row, e.g., displayed along a side of the display.

Each of the items may be selectable to perform a function. The function may be any of a variety of functions. For example, an item may be selectable to perform an action related to the respective item, e.g., such as activating a "do not disturb" state, entering a "sleep" state, beginning a presentation, etc. Alternatively, the item may be selectable to cause a second row of items related to the respective item to be displayed, as discussed below with respect to the method of FIG. 5. Further, the item may be selected to generate a list related to the respective item (e.g., each of which may be selectable to perform an action). Examples of these functions are provided and described in more detail below.

In 404, an element selection item (or "selection item") may be displayed at a first location on the display. Initially, a first item of the first row may be shown at the first location. More specifically, the selection item may indicate that the first item is currently selected. The selection item may be any visual indication that an element (in this case, the first item) is selected. In one embodiment, the selection item may be an icon that is displayed around or over a currently selected item to indicate that the item is selected. Additionally or alternatively, the selection item may be any visual indication of an item, such as highlighting of the item, increased size of the item, text accompanying the item, and/or animation of the item, among other possibilities.

In some embodiments, the selection item may include smaller icons, such as arrows (e.g., with animations, such as "bouncing" animations), which indicate the resulting actions of inputs of the remote control. For example, for a top level row (e.g., the initially displayed row that has no parent row), there may be no up arrow icon (assuming a top level horizontal row), but there may be left and right arrow icons indicating that the user can select items to the left or right. Thus, the selection item may provide visual indications of user input that may be received and/or the result of that input. Further examples of this behavior will be discussed below.

In 406, directional input may be received to associate the selection item with a second item in the first row of items. For example, a user may use a remote control device to provide the directional input (e.g., selecting up, down, left, or right inputs on the remote control device). More specifically, where the row is displayed as a horizontal row on the display, the directional input may be received as horizontal directional input (e.g., left or right input) to change from having the first item selected by the selection item to a second item being selected by the selection item. The second item may be immediately adjacent to the first item (e.g., it may be the item immediately to the left or right of the first item). Note that the user may wish to select an item that is more than one item away; however, the user will typically provide either continuous input (e.g., holding down a directional input) or multiple discrete inputs (e.g., selecting a directional input multiple times) to reach the desired item. Regardless, the input may typically request immediately adjacent items to reach the desired item.

In 408, a modified first row of items may be displayed in response to the directional input. More specifically, the first row of items may be moved by one item based on the directional input (e.g., in the direction opposite that indicated by the directional input). For example, in 404, the selection item may be positioned over the first item at a central location within the first row. In 406, the user may wish to highlight a second item to the right of the first item and may accordingly provide directional input to the right to cause the selection item to indicate selection of the second item. In response, in 408, the first row may be shifted to the left by one item, thereby causing the second item to be displayed at the same location as the selection item at the central location of the first row. Thus, in this particular embodiment, the selection item may remain in the same location, while the first item shifts from its initial location (that of the selection item) to one position to the left and the second item shifts from its initial location to the location of the selection item.

During this process, an item may disappear on the left side of the screen and a new item may appear on the right side of the screen, assuming a horizontal row and depending on the number of items in the first row. In some embodiments, the items may "wrap" where the left most item of the row (whether displayed or not) is adjacent to the right most item of the row (whether displayed or not). In a wrapping embodiment, a user may be able to reselect a particular item after providing a number of directional inputs (e.g., corresponding to the number of items in the row) in the same direction.

Accordingly, based on 408, the first item may no longer be selected and the second item may become selected. In some embodiments, a transition animation may be shown as the row is modified, showing the first item moving away from the selection item and the second item moving into the selection item. During the transition, the visual indications indicating that the first item is selected may disappear while they appear for the second item. For example, the first item may decrease in size while the second item increases in size. Additionally, text labeling the first item may disappear while text labeling the second item may appear. Any visual indications of the selection item may similar disappear from the first item and appear for the second item, e.g., in an animated fashion.

Note that in some embodiments, there may be a distinction drawn between an item (or icon) being selected and receiving input indicating acceptance of that item or confirming selection of the item. For example, confirmation of a selection (or input indicating acceptance of an item or selection of the item) may be performed by or in response to the user selecting an ok or confirmation input (e.g., as shown on the remote control device of FIG. 3). However, confirmation may also include providing a particular directional input that indicates confirmation of a previous selected item (e.g., by pressing the right directional input for a selected item displayed in a vertical list). Thus, the particular confirmation input may be context specific. Note that some functions may be performed in response to selection (e.g., without confirmation), such as displaying a submenu, whereas other functions may only be performed in response to confirmation of a selection (e.g., entering a "do not disturb" state). Generally, in any of the descriptions herein, any described actions may be performed in response to selection or confirmation of the selection, depending on the embodiment.

Figure 5:
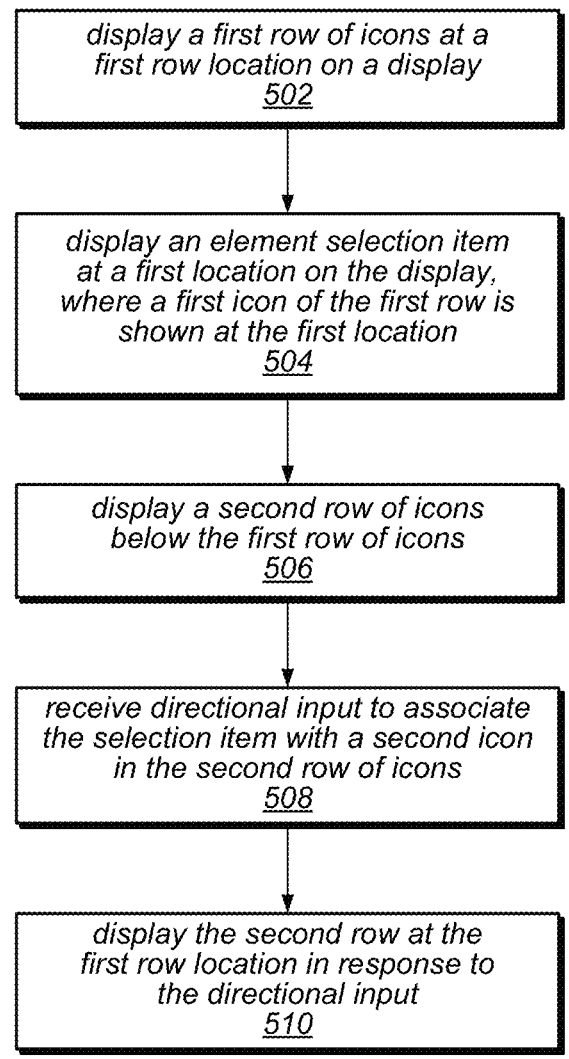

FIG. 5—Providing a User Interface for a Simple Remote Control Device

FIG. 5 illustrates an embodiment of a method for providing a user interface having multiple rows with multiple items. The method shown in FIG. 5 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 502, a first row of items may be displayed at a first row location on a display, similar to 402 above.

In 504, an element selection item (or "selection item") may be displayed at a first location on the display, similar to 404 above. Also similar to above, a first item of the first row may be shown at the first location. In one embodiment, the first item (in FIG. 5) may have been selected as the second item as described in the method of FIG. 4.

In 506, a second row of items may be displayed adjacent to (e.g., below) the first row of items, e.g., based on the selection of the first item. For example, the first row of items may be displayed as a horizontal row of items along the top of the display. The second row of items may be displayed as a second horizontal row of items below the first row of items. The second row of items may all be associated with or related to the first item that is currently selected. For example, the second row of items may act as a submenu for the currently selected item. In some embodiments, the second row of items may be automatically displayed in response to selection of the first item. Alternatively, the second row of items may be displayed in response to confirmation of selection of the first item (e.g., and not displayed in response to only selection).

In some embodiments, the second row of items may have a "grayed out" or transparent appearance compared to the first row. For example, the items of the second row may have a higher transparency than the items of the first row. This appearance may indicate that the second row of items is not currently "in focus", e.g., until the user wishes to select an item in the second row. Other appearances which convey a similar meaning are also envisioned.

In 508, directional input may be received to associate the selection item with a second item in the second row of items. For example, where the rows of items are displayed in a horizontal orientation, and the second row is displayed below the first row (although other embodiments are envisioned), the user may provide down directional input using a remote control to select the second item which may be immediately below the first item. Note that the second item may be the item which was last selected in the second row of items. For example, the user may have previously accessed the second row of items and selected one of the items. Later, the user may have escaped the second row of items (e.g., by providing up directional input. Accordingly, the item of the second row immediately below the first item may be the item that was last selected in the second row of items. Thus, the second row may be "sticky" and may remain in its last position when redisplayed. However, other embodiments are envisioned where a default item of the second row of items is displayed immediately below the first item.

In 510, the second row may be displayed at the first row location in response to the directional input. More specifically, the second row of items may move into the position of the first row of items. The first row of items may be removed from the screen. Accordingly, the second row of items may no longer have a "grayed out" or "transparent" appearance since it is now in the position of the first row and "in focus". Additionally, similar to 408 above, the selection item (now indicating selection of the second item) may remain in the same location (e.g., centered in the first row location), and the second item may move into that position. Similar to descriptions above, an animation may be shown to indicate the transition of the second row moving from its original location to the first row location.

FIGS. 6A-6F—Exemplary Interfaces Corresponding to FIGS. 4 and 5

FIGS. 6A-6F are exemplary user interfaces which correspond to one embodiment of the methods of FIGS. 4 and 5. More specifically, these user interfaces correspond to an embodiment involving videoconferencing. These graphical user interfaces are provided as examples only and do not limit any of the embodiments described above.

Figure 6A:
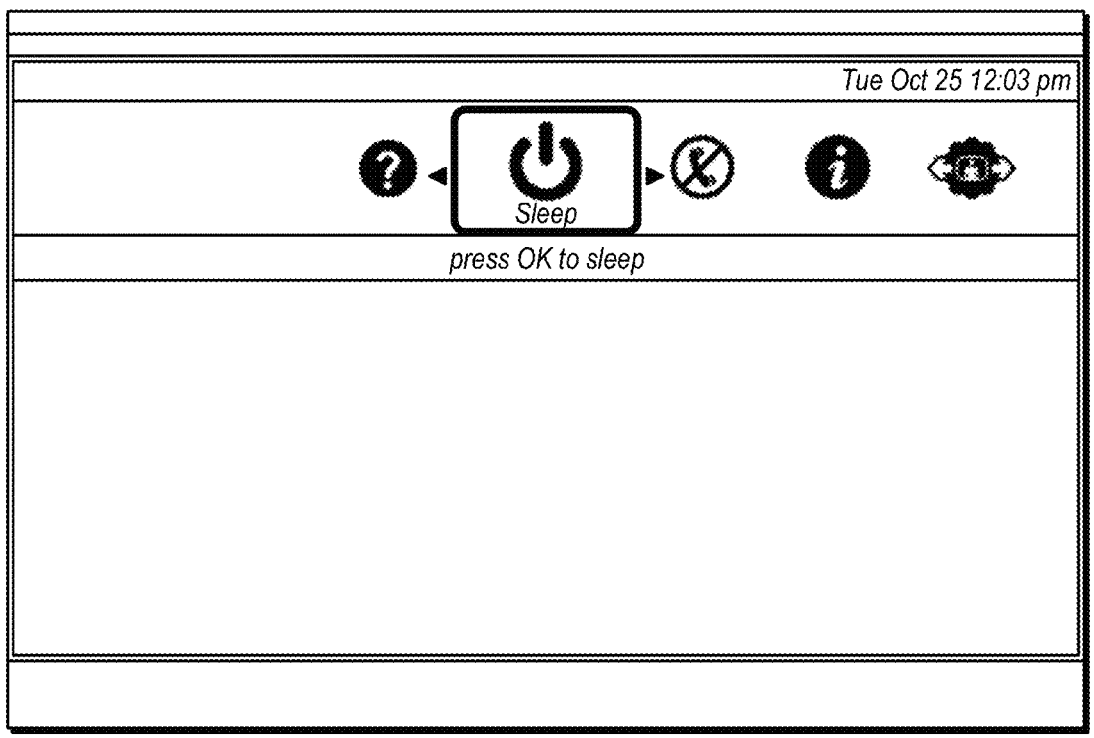
FIGS. 6A-6F illustrate exemplary interfaces corresponding to FIGS. 4 and 5, according to one embodiment.

FIG. 6A illustrates an exemplary user interface where a plurality of icons are shown in a horizontal row across the top of the display. As shown, a selection item indicates that the "sleep" icon is currently selected. In this particular embodiment, the "sleep icon" is enlarged relative to the other icons in the row and also includes text labeling the icon (in this case, the text "sleep" is shown below the icon). The remaining icons that are not currently selected do not have their text shown. Further, the icon is surrounded by a rectangular icon. Below this selection item is text describing the function or use of the icon (in this case, the text is "press OK to sleep"). Additionally, left and right arrows are displayed outside the rectangular icon on the left and right, respectively. These icons indicate that the user may provide directional input to the left and right to select icons to the left and right, respectively. In one embodiment, these icons may be animated, e.g., using a "bouncing" animation. Note that the selection item may be considered any of the above visual modifications which visually indicate that the sleep icon is currently selected.

In addition to the currently selected "sleep" icon, a "help" icon is shown on the left, a "do not disturb" icon is shown to the right, an "information" icon is shown to the right of that icon, a "connection" icon is shown to the right of that icon, and a portion of another icon is shown to the right of that icon. Further, in some embodiments (not shown in these Figures), a background image may be displayed within the user interface. The first row of icons may be semi-transparent (e.g., having 5%, 10%, 25%, etc. transparency, although other values are envisioned).

In FIG. 6A, the user may wish to select the icon immediately to the right of the "sleep" icon (in this particular case, the "do not disturb" icon). Accordingly, the user may provide directional input to the right (by selecting the right directional input of the remote control device) to select that icon. In response, the row of icons may be shifted to the left in an animated fashion, resulting in FIG. 6B. As discussed above, the visual indications indicating selection of the first icon may disappear for the first icon and appear for the second icon, (although in a manner consistent with the second icon).

Figure 6B:
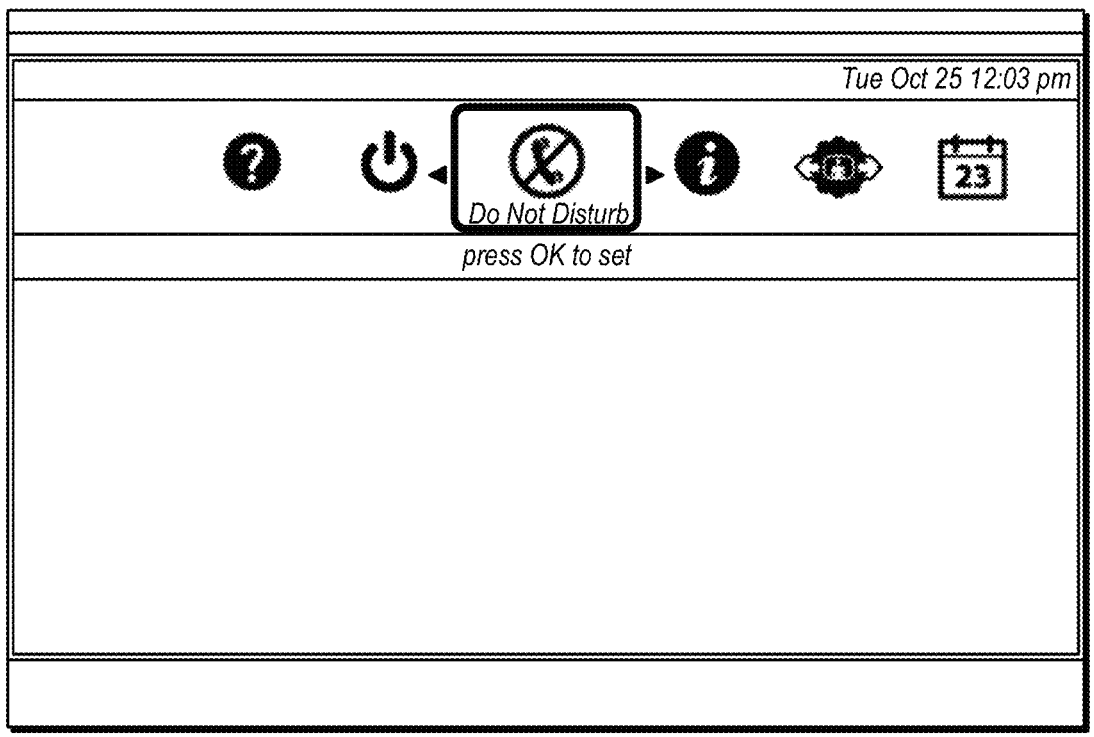

As shown in FIG. 6B, the "sleep" icon, which was previously selected, has shifted to the left and is no longer visually indicated by the selection item. More specifically, the icon has decreased in size, does not have any associated text, does not have a rectangular icon around it, etc. In contrast, the newly selected icon, "do not disturb", is now centered in the row, enlarged, has a label ("do not disturb"), has the rectangular icon around it, has left and right icons outside of the rectangular icon, and has text describing its use ("press OK to set"). Because all of the icons have decreased shifted, a new "calendar" icon has appeared as the farthest icon to the right in the row. Additionally, note that the first and second icons of FIGS. 6A and 6B have an associated action which may be performed in response to confirmation of their selection.

Figure 6C:
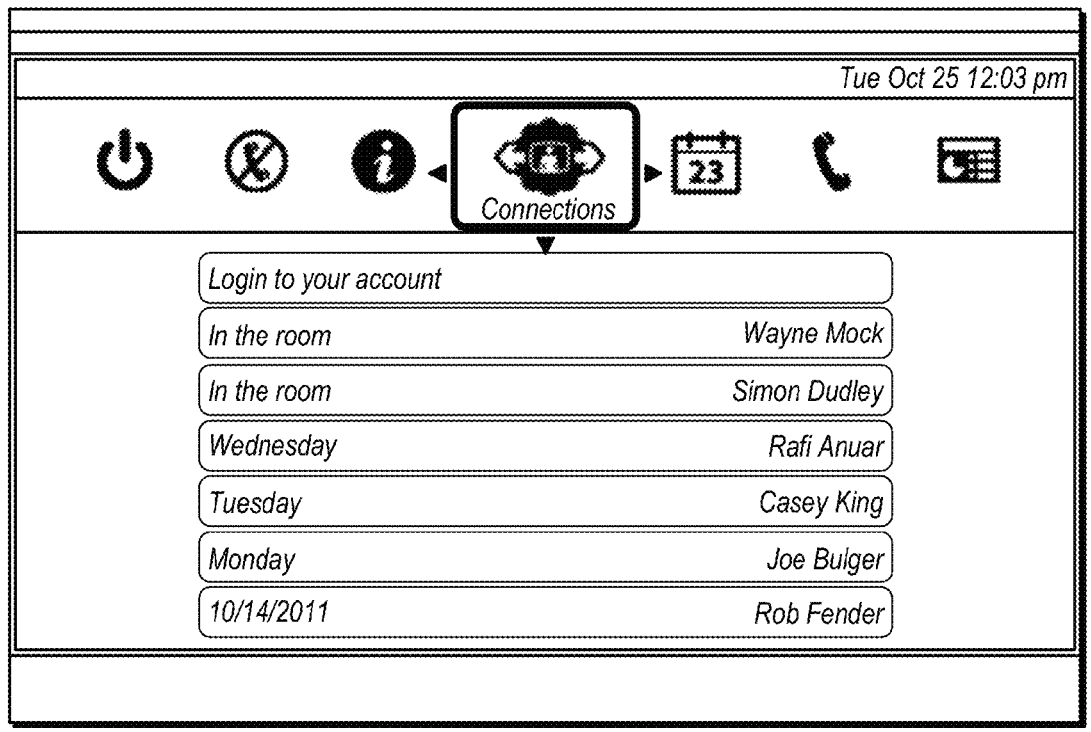

In the example of FIG. 6C, the user has provided right directional input twice (repeating the shifting actions as in FIGS. 6A and 6B) to select the "connections" icon. For this icon, a list or table of items is displayed below the first row. As shown, a new down arrow icon is shown, indicating that the user can select items in the list of items. More specifically, various users or previous users may login to the videoconferencing endpoint by selecting the items.

Figure 6D:
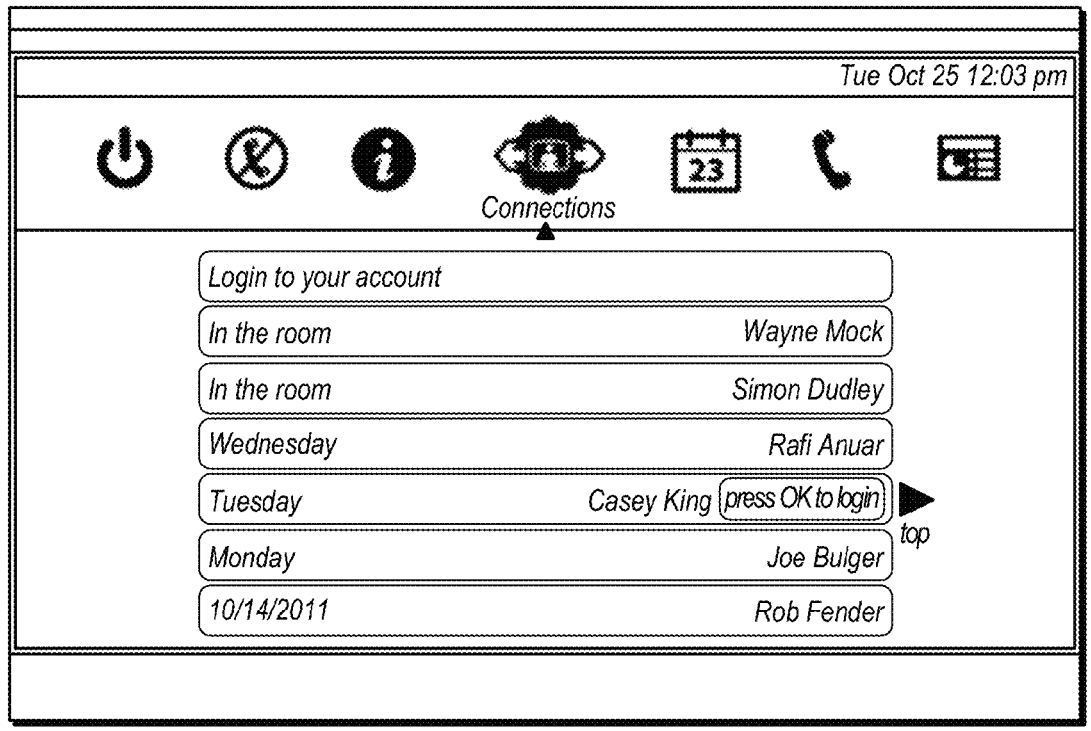

As shown in FIG. 6D, the user has selected the item "Tuesday"—"Casey King", which is visually indicated by a highlight around the box of the item, as well as the right arrow next to the item (with the text "top" indicating that the user can provide the right directional input to move to the top of the list) and the text "press OK to login", indicating that confirming the selection will log in "Casey King". As also shown in FIG. 6D, an up arrow icon is shown below the "connections" icon in the row of icons, indicating that the user can return back to the menu by reaching the top of the list (e.g., by providing the right directional input) and pressing the up directional input.

Figure 6E:
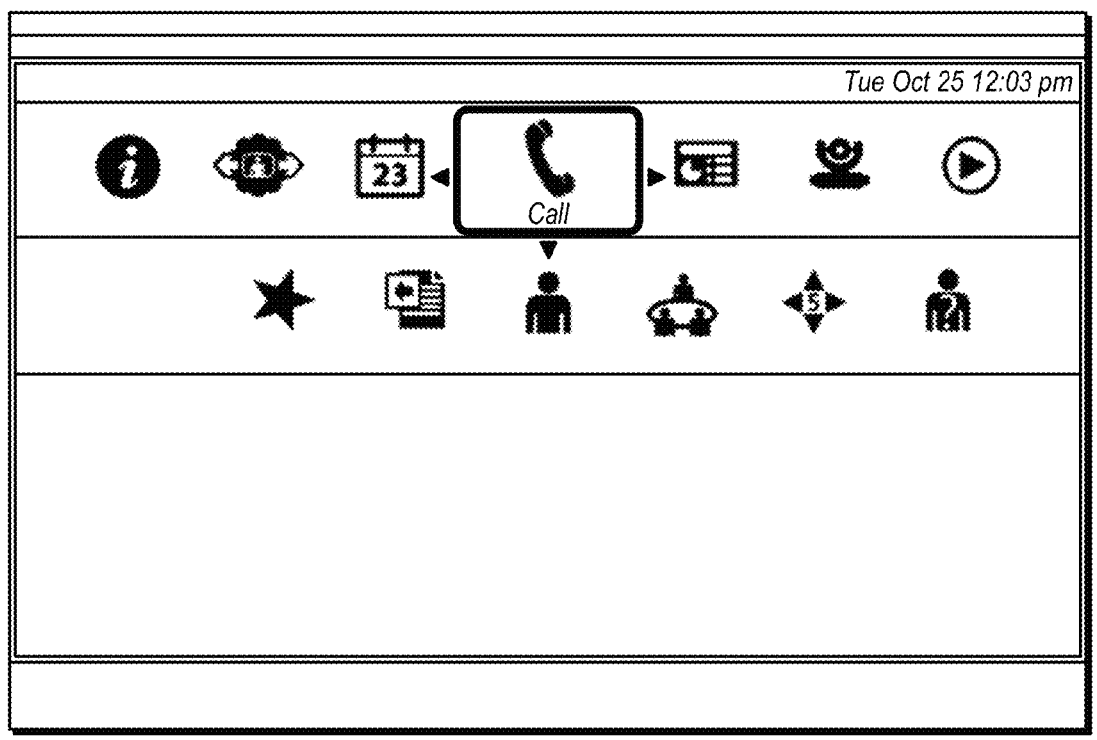

In FIG. 6E, the user has returned to the first row of icons and selected the "call" icon. In response to selection of the "call" icon, a second row of icons associated with the "call icon" is displayed below the first row of icons. For the "call" icon, the user can select left or right directional inputs to select icons to the left or right of the "call" icon or may access the submenu in the second row of icons by selecting the down directional input, as is indicated by the arrow icons around the "call" icon. In this case, the icon immediately below the "call" icon is a "directory" icon. As indicated above, the "directory" icon may have been the last icon selected in this submenu and may therefore remain in the position under the "call" icon. Alternatively, the "directory" icon may be the default icon associated with the "call" icon and may always be displayed underneath the "call" icon when the "call" icon is selected.

Figure 6F:
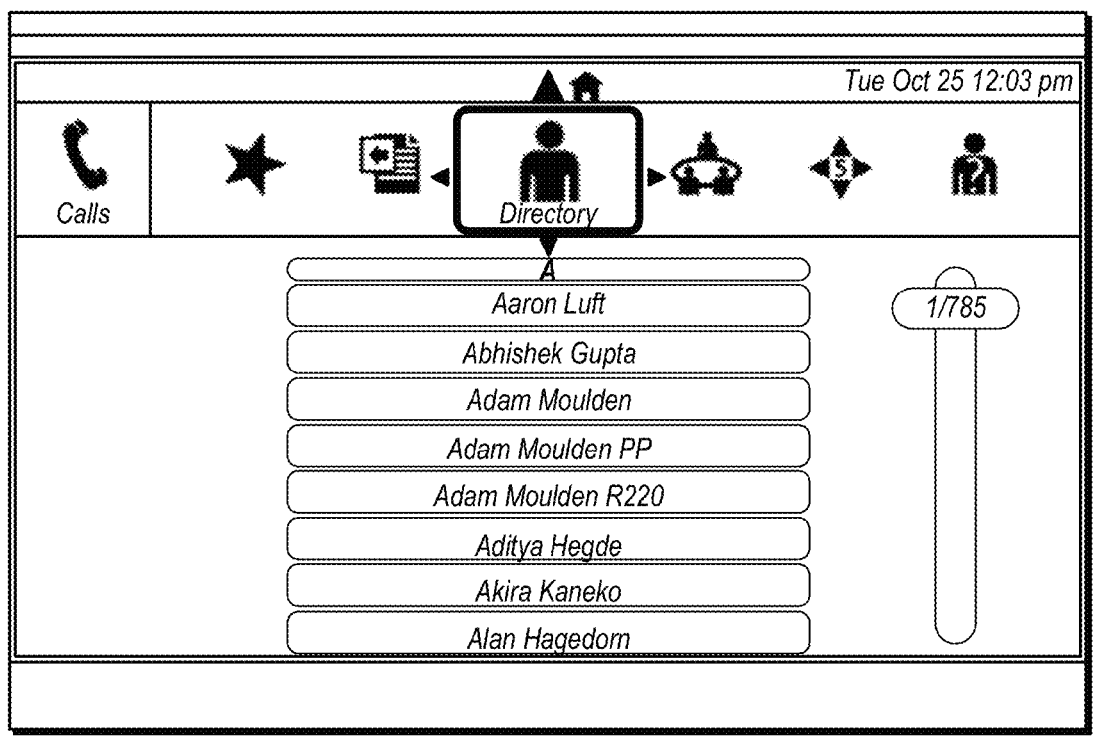

In FIG. 6F, the user has selected the down directional input. Accordingly, the second row has now moved into the first or primary row location and the first row has disappeared. At this point, the "directory" icon is indicated as selected by the selection item". From this point, the user can choose any direction: left to select the icon to the left, right to select the icon to the right, down to access the list of contacts (in this case, there are 785, as indicated by the scroll bar to the right of the list), and up to access the previous, top level menu. The fact that the previous upper level menu is a top level menu is indicated by the "home" icon next to the up arrow icon displayed above the rectangle of the selection item. Note further that the parent icon is shown on the left (in this case "calls") indicating which parent icon the submenu belongs to. This icon may be visually indicated in a different color and transparency and may remain in this position (e.g., may be "static") regardless of how the user selects the various sub-menu icons within the call submenu. As shown in FIG. 6F, the list of contacts is sorted by first word in alphabetical order.

As can be seen, in the embodiment shown in FIGS. 6A-6F, the selection item generally maintains a constant position for the rows of the user interface. Accordingly, the user is able focus on a single position of the display without having to visually roam the display. Additionally, the user interface provides visual indications of the functions of the various inputs of the remote control device for the user, e.g., at or near the point of focus. Accordingly, the user can quickly perform desired actions without encountering confusion.

Figure 7:
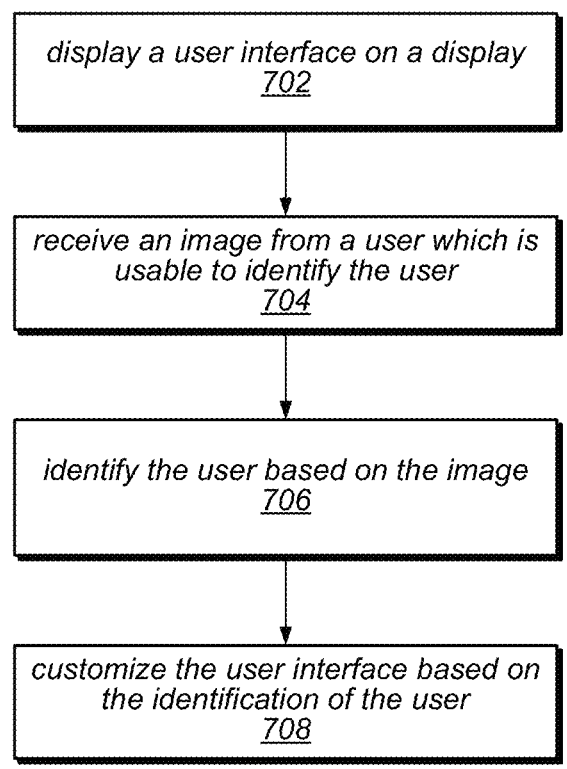
FIG. 7 is a flowchart diagram illustrating an embodiment of a method for determining presence of a user based on an image.

FIG. 7—Determining Presence of a User Based on an Image

FIG. 7 illustrates an embodiment of a method for determining presence of a user based on an image. The method shown in FIG. 7 may be used in conjunction with any of the computer systems or devices shown in the above Figures, among other devices. In various embodiments, some of the method elements shown may be performed concurrently, performed in a different order than shown, or omitted. Additional method elements may also be performed as desired.

Generally, the method may detect that a user is in proximity to a device, such as a conferencing system. As used herein "in proximity to" or general descriptions related to a user being "proximate to" a conferencing system refers to a user that is close enough in distance to participate in a conference using the conferencing system. Generally, a conferencing system may be within a conference room, so a user being proximate to such a conferencing system may simply refer to the user being within the same conference room as the conferencing system. However, where a room is very large, a user may need to be closer to the conferencing system than simply being within the same room to be considered "proximate to" the conferencing system. Similar remarks refer to other types of devices, such as set top boxes, e.g., where "in proximity to" may be within the same room as the entertainment system and/or close enough to use the set top box for its desired function.

The detection that the user is proximate to the device may be performed manually or automatically, as desired. This detection may be performed in a variety of manners, such as via user input (e.g., entering a PIN), providing audible commands (e.g., a log in phrase), voice recognition, facial recognition, visual gestures, automatic detection of a personal device of a user (e.g., using Bluetooth, 802.11, NFC protocols, etc.), etc. In general, the detection may be performed in any of the manners described in U.S. patent application Ser. Nos. 13/194,656 and/or 12/724,226, which were incorporated by reference in their entirety above, among other possible detection methods.

In the particular embodiment shown in FIG. 7, the detection of the user may be performed based on an image provided by the user. As shown, the method may operate as follows.

More specifically, in 702, a user interface may be displayed on at least one display. For example, the interface described above (e.g., with respect to FIGS. 4 and 5) may be displayed to a user on the at least one display. In one embodiment, the user interface may relate to videoconferencing and may be displayed by a videoconferencing unit. However, the user interface may be any of a variety of interfaces, as desired. More specifically, the user interface may be displayed (or caused to be displayed) by any device that is capable of providing video signals to a display, which may be integrated with the device or not, as desired. For example, the device may include a set top box or other component which connects to a monitor or display in an entertainment system. Other types of devices and user interfaces are also envisioned.

In 704, an image may be received from the user which is usable to identify the user. For example, the image may include a bar code or quick reference (QR) code which encodes information that is usable to identify the user. However, other types of images are also envisioned, e.g., including a badge of the user, a photo of the user, a credit card or other type of card which identifies the user, etc. Thus, any image that identifies the user may be used.

The image may be provided to the device in any number of manners. For example, the user may store the image in a personal device of the user, such as a personal communication device (e.g., a cell phone, tablet computer, etc.) or any type of device which is able to store and display or transfer the image. In one particular embodiment, the user may load the image as a photo and have it displayed on the personal device. The user may then present the displayed image on the personal device to the device to be customized (e.g., the conferencing unit). For example, in an embodiment where the user is interacting with a conferencing unit, the user may present the displayed image to a video input (e.g., a camera) of the conferencing system, which may be detected by the conferencing unit (or even the camera), as desired. In other embodiments, there may be a bar code reader or other dedicated device for receiving the image, as desired.

As another possibility, the personal device may be configured to provide the image to the videoconferencing unit (or other type of device, depending on the embodiment) digitally, e.g., using a wireless communication protocol, such as Bluetooth, NFC, WiFi, RFID, etc. For example, the user may execute an application on the personal device which is configured to establish communication with the conferencing unit and provide the image to the conferencing unit for identification, e.g., automatically, in response to user input to initiate the communication.

Thus, in 704, an image identifying the user may be provided to the device.

In 706, the user may be identified based on the image. For example, the device may decode the bar code or QR code to determine the information in the image. The information may uniquely identify the user, e.g., including his name, PIN, employee number, and/or any other identifying information. Where other types of images are received, other processing may be performed to identify the user. For example, image processing may be used to match a provided image of the user to a stored image associated with the user. Once located, other associated user information may be determined, e.g., for customization of the device, such as the user interface presented to the user by the device.

In 708, the user interface may be customized and displayed based on the identification of the user. Customizing the user interface may include loading content associated with the user. In some embodiments, the content may already be stored on the device or it may be automatically downloaded from a server (e.g., over a local area network (LAN) or wide area network (WAN), such as the Internet). Accordingly, the content may be loaded onto the device so as to customize the device for the user. The content may be any of various settings or other information that is already associated with the user.

For example, for a conferencing system, such as a videoconferencing system, the content may include a contact list associated with the user. Thus, even though the user may be using a new device (e.g., one that he has not used previously), his contact list may be loaded and available at the new device based on the automatic customization. Similarly, other content may be loaded, such as device identification settings (e.g., to rename the device to indicate the presence of or customization for the user), lighting settings, recording settings, camera settings or presets, conferencing layout settings (e.g., for videoconferences), presentation settings, background images, menu layouts, schedule, upcoming meetings, previously invited guests, etc.

Further, a schedule (e.g., a conference schedule) associated with the user may be loaded. For example, the user may be able to select an upcoming conference and initiate the conference using the schedule. Additionally, some of the customizations described above may also be based on an upcoming conference. For example, if the upcoming conference is for a single person in the conferencing room, the camera settings or presets may be customized for having a single person. Similarly, the loaded layout settings may be customized based on the expected number of participants or other endpoints in an upcoming conference.

Accordingly, in one embodiment, the device may be customized based on the proximity of the user. While many of the above examples apply to conferencing systems, other customizations are envisioned. For example, for a DVR or cable set top box, various favorite channels or previously recorded content may be loaded based on identification of the user. Similarly, for a gaming console, previous purchased games, a friends list, etc. may be downloaded in response to the identifying the user. Thus, any of a variety of devices may be customized in the manner described above.

Figure 8A:
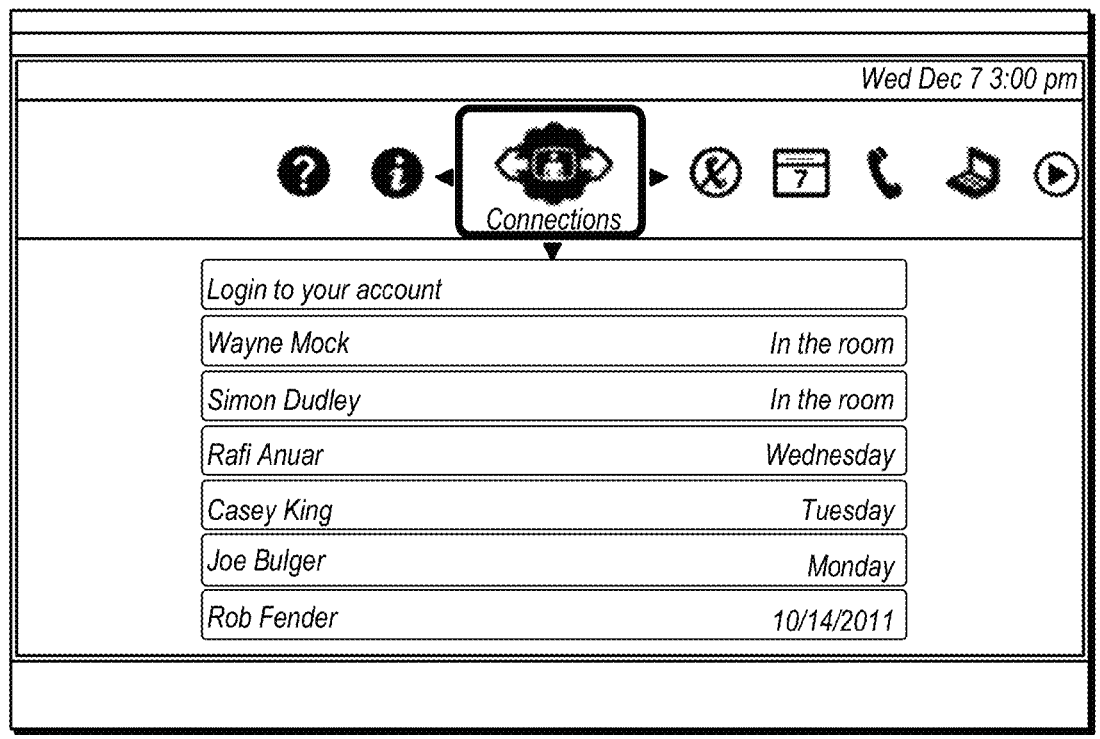
FIGS. 8A-8C illustrate exemplary interfaces corresponding to FIG. 7, according to one embodiment.
Figure 8B:
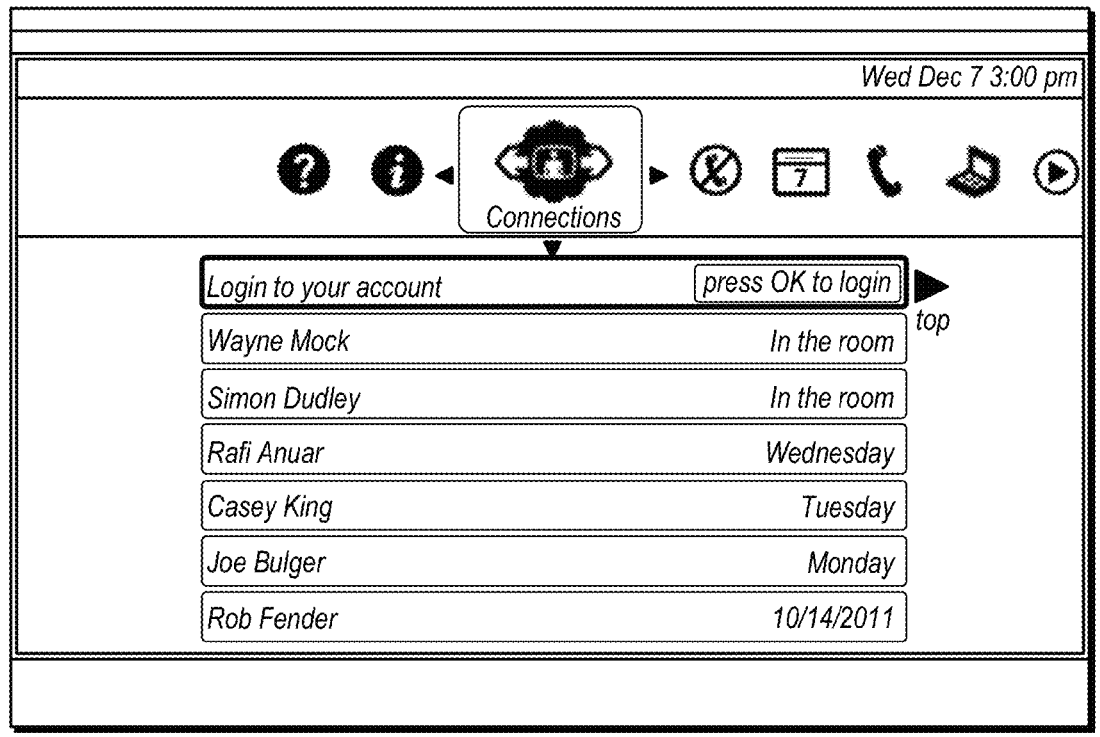
Figure 8C:
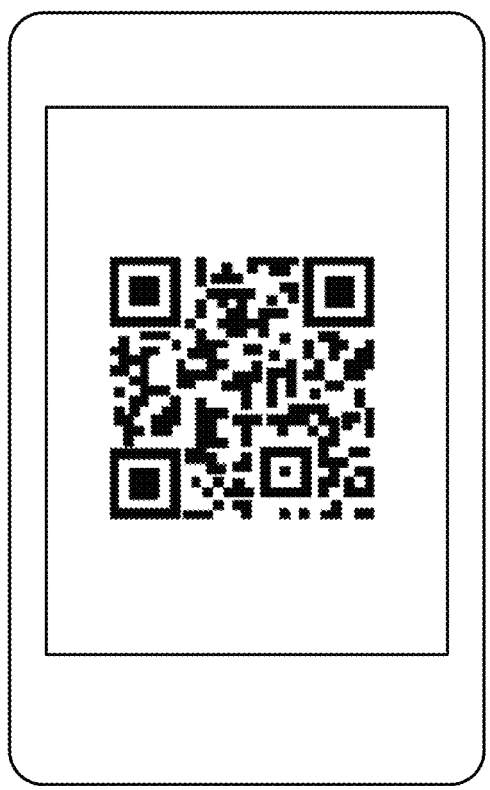

FIGS. 8A-8C—Exemplary Interfaces Corresponding to FIG. 7

FIGS. 8A and 8B are exemplary user interfaces which correspond to one embodiment of the method of FIG. 7. More specifically, these user interfaces correspond to an embodiment involving videoconferencing. These graphical user interfaces are provided as examples only and do not limit any of the embodiments described above.

In FIG. 8A, an exemplary user interface is initially displayed. As shown, the user has selected the "connections" option from the top level menu in FIG. 8A and has selected the "Login to your account" option in FIG. 8B. Upon pressing "OK" or the confirmation input, the user may login to the device using one or more of the various options discussed above, e.g., by presenting an image of a QR code to the videoconferencing system (such as via the camera of the videoconferencing system). FIG. 8C illustrates an exemplary phone showing a QR code. Upon logging in, various user data may be loaded into the videoconferencing system, which may result in various changes to the user interface, such as loading the schedule of the user, contacts of the user, camera settings of the user, layout settings of the user, etc.

Figure 9:
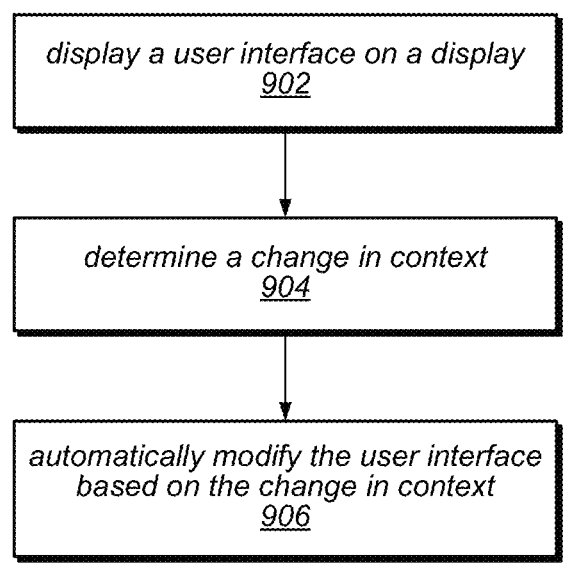
FIG. 9 is a flowchart diagram illustrating an embodiment of a method for modifying a user interface based on user activity.

FIG. 9—Modifying a User Interface Based on User Activity

FIG. 9 illustrates an embodiment of a method for modifying a user interface based on user activity. The method shown in FIG. 9 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, the method may operate as follows.

In 902, a user interface may be displayed, similar to 702 above. Generally, the user interface may include a first plurality of icons, e.g., at a top level. For example, the first plurality of icons may correspond to the first row of icons described in FIGS. 4 and 5. More specifically, the top level icons may be the icons that are initially displayed when the user interface is invoked, e.g., which correspond to a first set of functions that the user may wish to invoke. As noted above, the user interface may be dedicated to a videoconferencing system, e.g., for performing videoconferencing activities; however, other embodiments are envisioned, e.g., for set top boxes, or other devices, as desired.

In 904, a change in context may be detected. The change in context may result from any of a variety of actions. In one embodiment, a user may invoke an activity, e.g., by selecting an action from the user interface. For example, the user may select an icon in the user interface using a selection item. The icon may be one of the first plurality of icons at the first level, or may be one of a lower level (e.g., a child icon of one of the first plurality of icons). However, the activity may be selected in any number of alternate methods as well, e.g., using a dedicated button on the remote control, in response to user input from another videoconferencing system (e.g., in videoconferencing embodiments), etc.

For example, following videoconferencing embodiments, the user may select an option to enter a presentation mode. Accordingly, the context may be changed, e.g., from being in a videoconference to providing a presentation in the videoconference. As another option, the user may select an option to enter a videoconference (e.g., where the context is changed from previously not being in the videoconference to entering the videoconference). A variety of other actions are also envisioned (e.g., separate from videoconferencing), such as beginning playback of a video (e.g., a movie, TV show, etc.), beginning play of a game, entering a recording mode, beginning an Internet browsing session, etc.

However, context changes may occur other than actions invoked by a local user. For example, a remote user may cause a context change, such as by the remote user beginning a presentation. Context changes could include the type of content being provided, e.g., a first context when desired content (such as a TV show or movie) is provided and a second context when other content (such as commercials) is provided. Further, context changes could include current date, day of the week, (e.g., whether it is a weekend or weekday), current time (e.g., day time, night time, business hours, etc.), number of users in the room or in a conference, various environmental factors (e.g., activities being performed by users near the device, such as cooking, watching television, using a portable device, etc.). Thus, a context change may be caused by any number of factors. Further context changes related to conferencing may include starting a voice call, starting a video call, starting a presentation during a video call, etc. Generally, context changes may relate to any activity that is supported by the system.

In 906, the user interface may be automatically modified based on the change in context in 904. Changes to the user interface may be based on the particular context detected in 904. In embodiments where the context change is based on the invocation of actions, the user interface may be customized based on the particular action that was invoked. For example, following embodiments where the user interface includes a first plurality of top level icons, the user interface may be modified to include a second plurality of top level icons. More specifically, the top level icons may be modified such that the new set of icons relate or are useful based on the current activity and those that are not related or useful may be removed or moved to a lower-level. For example, a new icon may be added to the top level for "other" or "advanced" and previous top level icons that are no longer present may be selected using the new "other" or "advanced" (or other label) icon. The new top level set of icons may be from the previous top level set of icons and/or may be new icons, as desired.

For example, where the user has entered a presentation mode, the initially presented top level icons may be changed to those that relate to presenting and those that are not related may be moved to a lower-level, e.g., beneath an "advanced" or "other" top level icon. Similar embodiments may apply to initiating playback of video, recording, entering or initializing a videoconference, etc. FIGS. 10A-12H provide some examples of this behavior.

While the above descriptions focus on top level icon embodiments, the change in the user interface is not limited to such embodiments (e.g., having rows of icons such as previously discussed). For example, the user interface may simply make choices or icons representing functions that relate to the context change more prominent, e.g., by adding visual cues to these options in the user interface.

For other types of context changes, other modifications may be performed. For example, where content changes from desired content to undesired content (e.g., from a TV show or movie to commercials), the user interface may be changed such that a mute option is selected or is more prominent than other options (e.g., at the top level). When recording, an option to stop recording may be more prominent (e.g., at the top level). Various other changes to the user interface based on the context change are contemplated.

Thus, in FIG. 9, a user interface may be modified based on a detected change in context.

FIGS. 10A-12H—Exemplary Interfaces Corresponding to FIG. 9

FIGS. 10A-10C, 11A-11B, and 12A-12H are exemplary user interfaces which correspond to one embodiment of the method of FIG. 9. More specifically, these user interfaces correspond to an embodiment involving videoconferencing. These graphical user interfaces are provided as examples only and do not limit any of the embodiments described above.

Figure 10A:
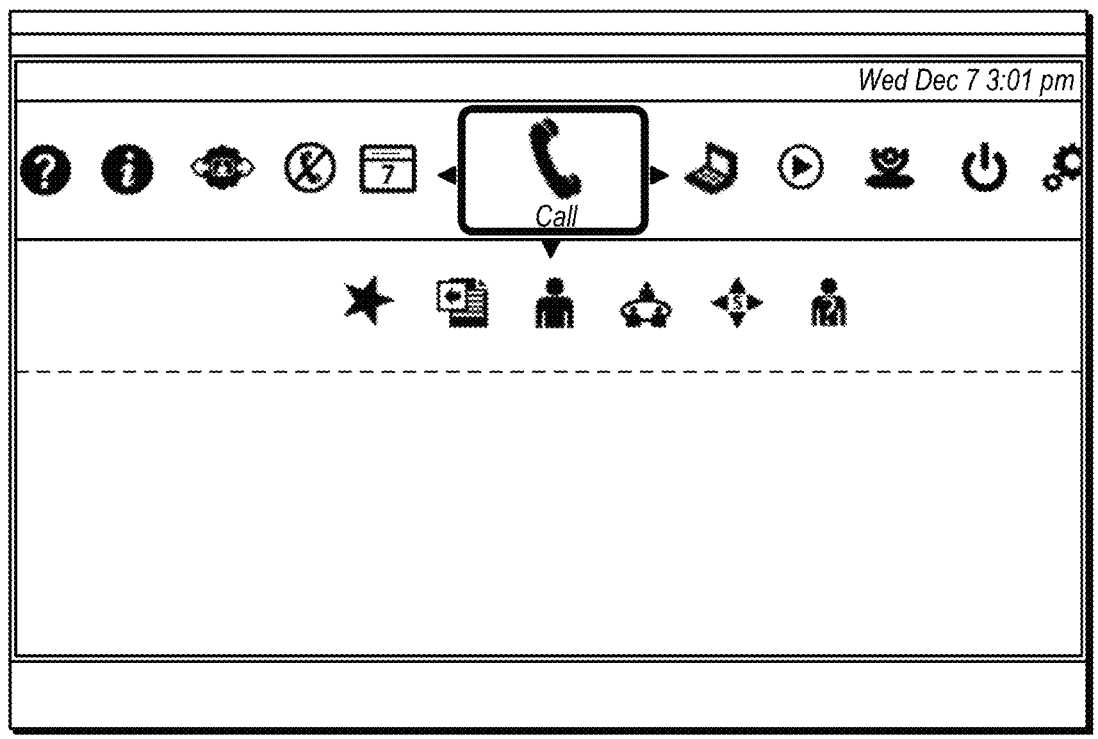
FIGS. 10A-12H illustrate exemplary interfaces corresponding to FIG. 9, according to one embodiment.
Figure 10B:
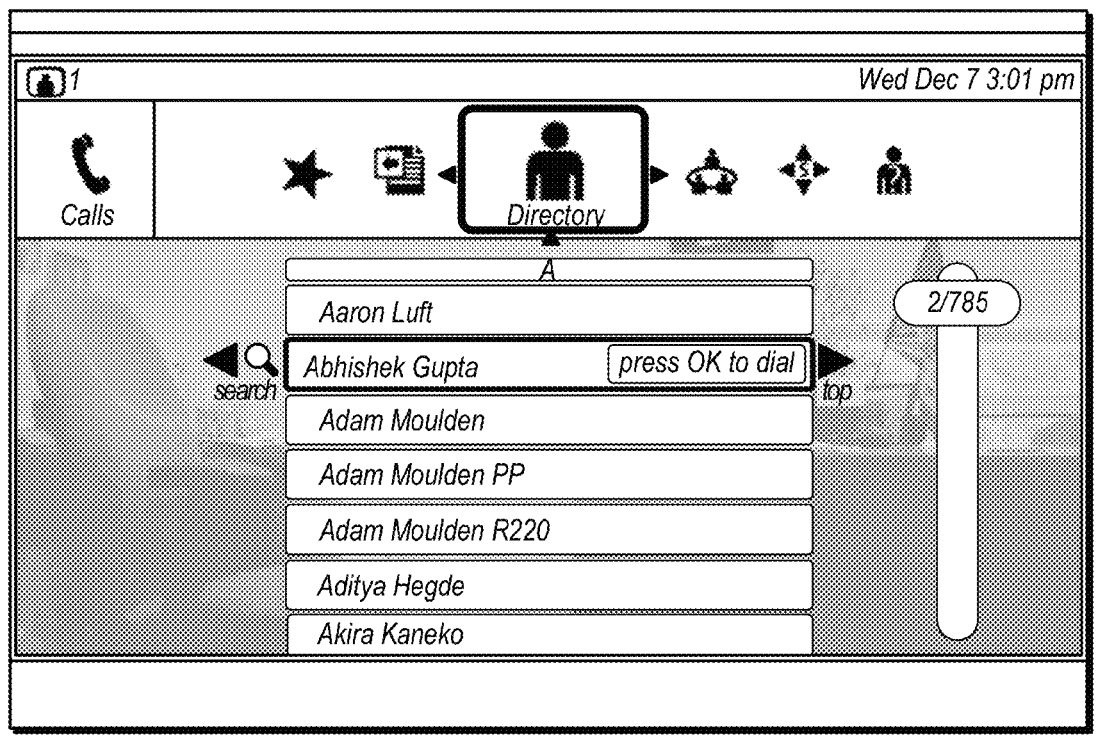
Figure 10C:
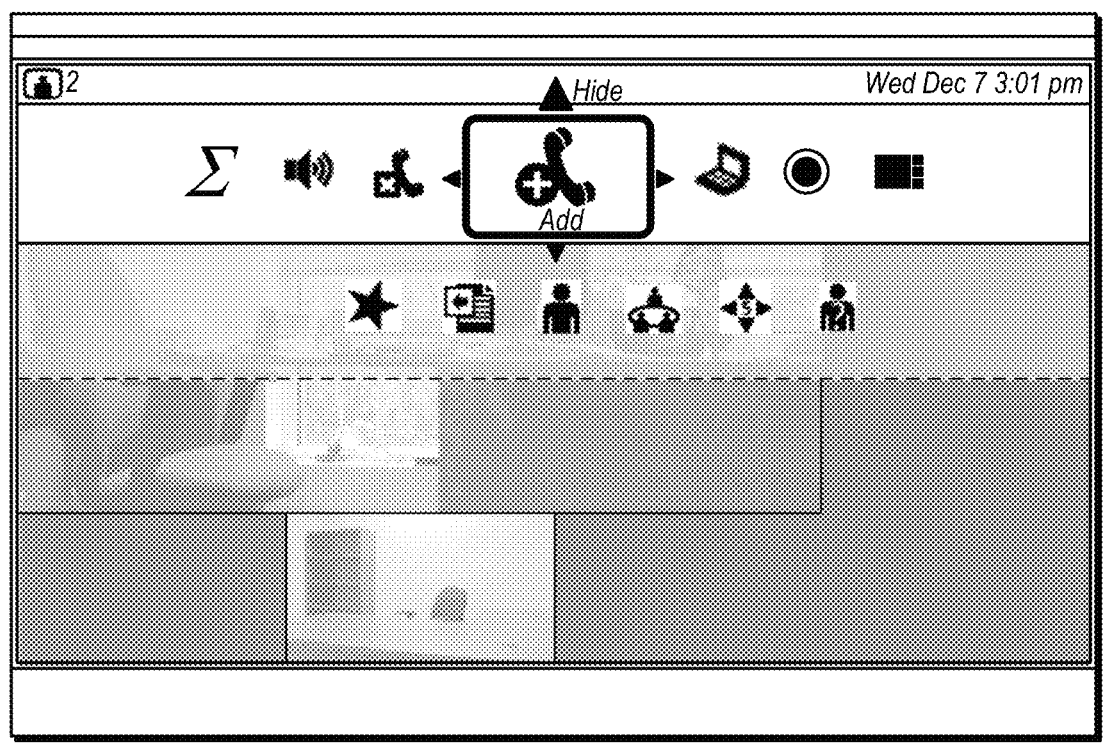

FIGS. 10A-10C illustrate a change in user interface when initiating a videoconference. More specifically, in FIG. 10A, the icon "call" is selected using the selection item. The call icon is shown at the top level, among a plurality of other icons. Additionally, a lower level, below call is shown, which provides a set of options related to various call options or functions.

As shown in FIG. 10B, the user has selected "Abhishek Gupta" from the directory icon within the "call" sub-level. As also shown, video corresponding to the selected participant is shown in the background.

In FIG. 10C, after initiating the call with Abhishek, a new top level set of icons are shown. The currently selected icon, "add" may be used to add another caller to the videoconference. Other options at the top level include presentation, mute, volume control, record, layout change, and "advanced" (shown as a sigma icon), which may be used to access others of the previous top level icons, shown in FIG. 10A.

Figure 11A:
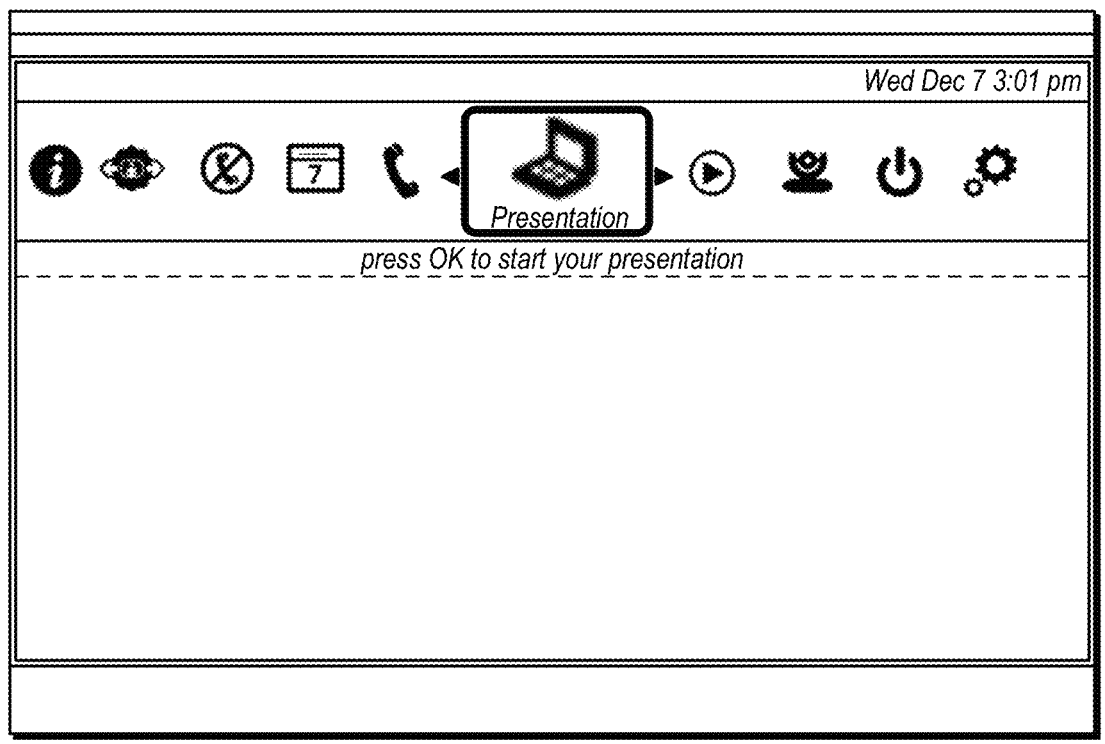
Figure 11B:
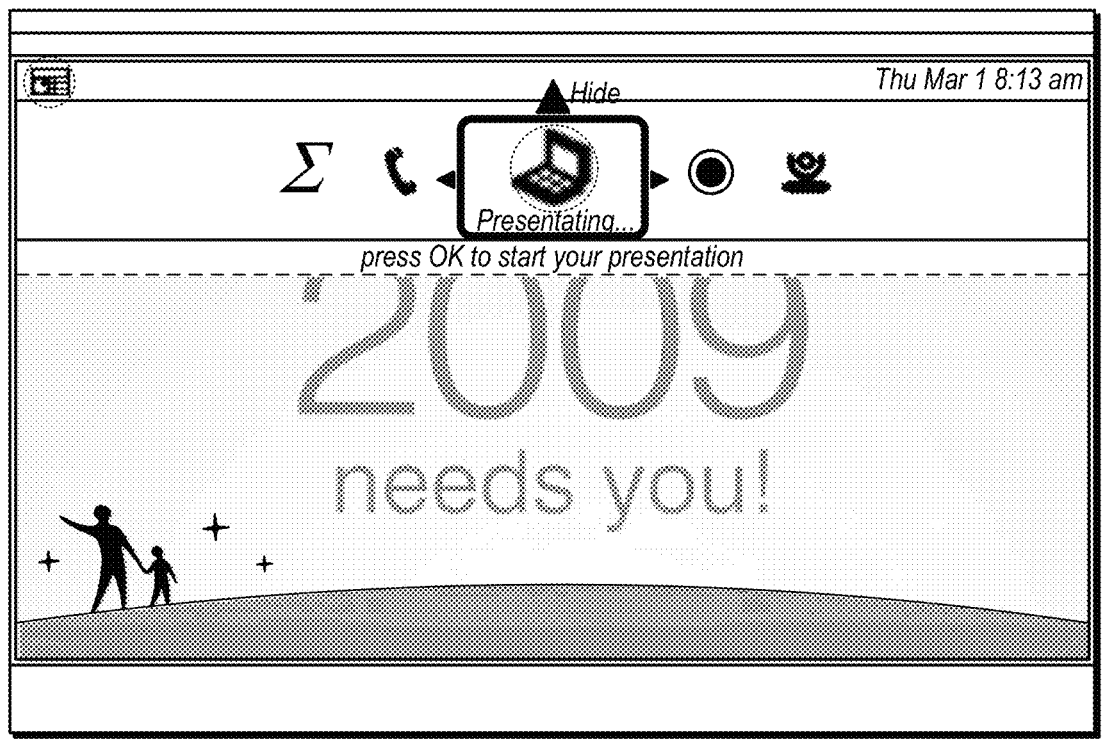

FIGS. 11A and 11B illustrate modification of a user interface based on initiation of a presentation. As shown in FIG. 11A, the user has selected the "presentation" icon from the initial set of top level icons. In FIG. 11B, the top level has been modified to include functions related to presentation (e.g., call functions, recording, camera control, etc.) as well as the "advanced" icon, which may be used to access previous top level icons of FIG. 11A.

Figure 12A:
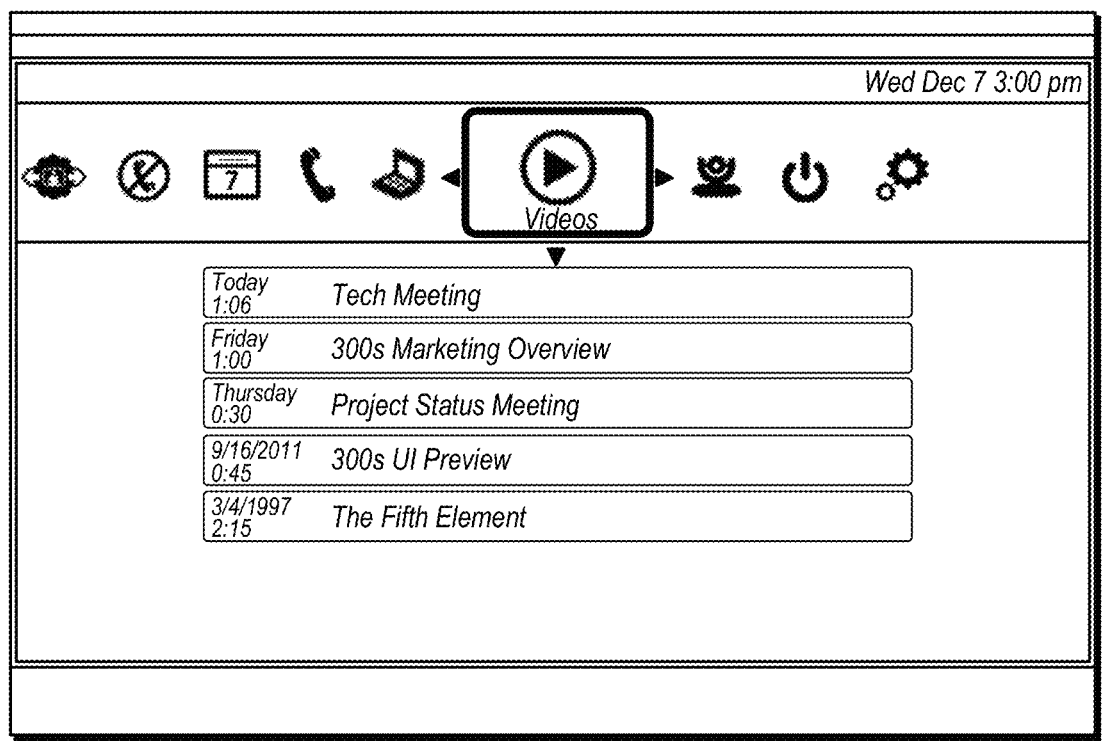
Figure 12B:
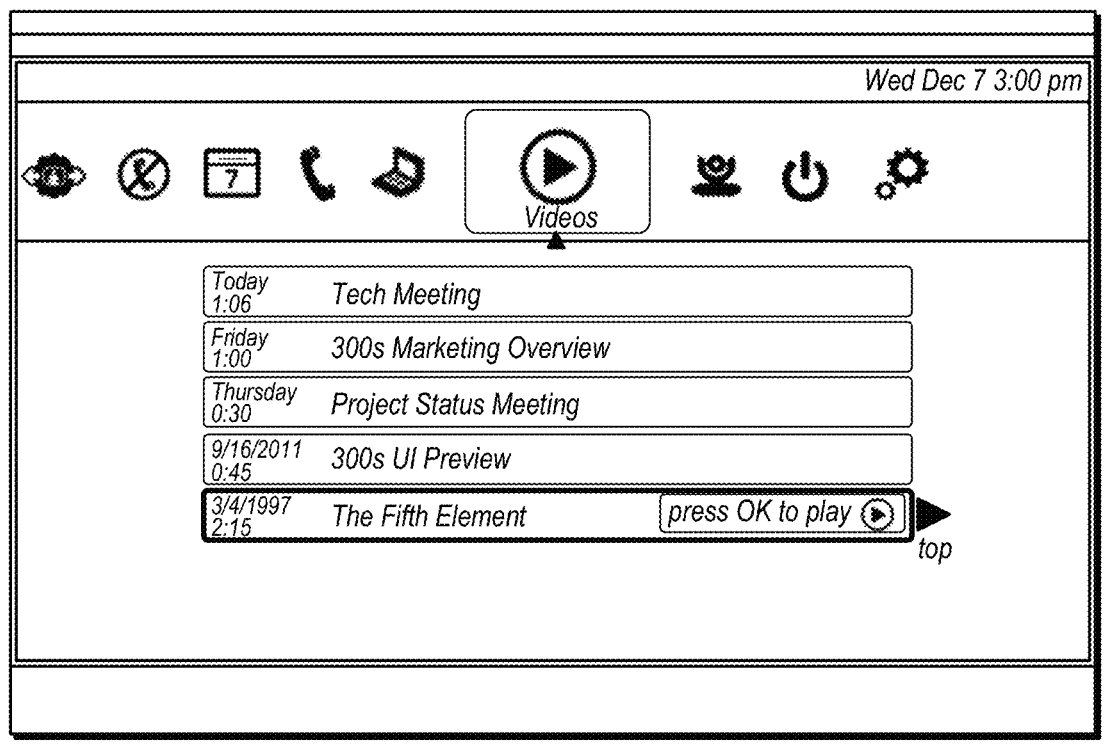
Figure 12C:
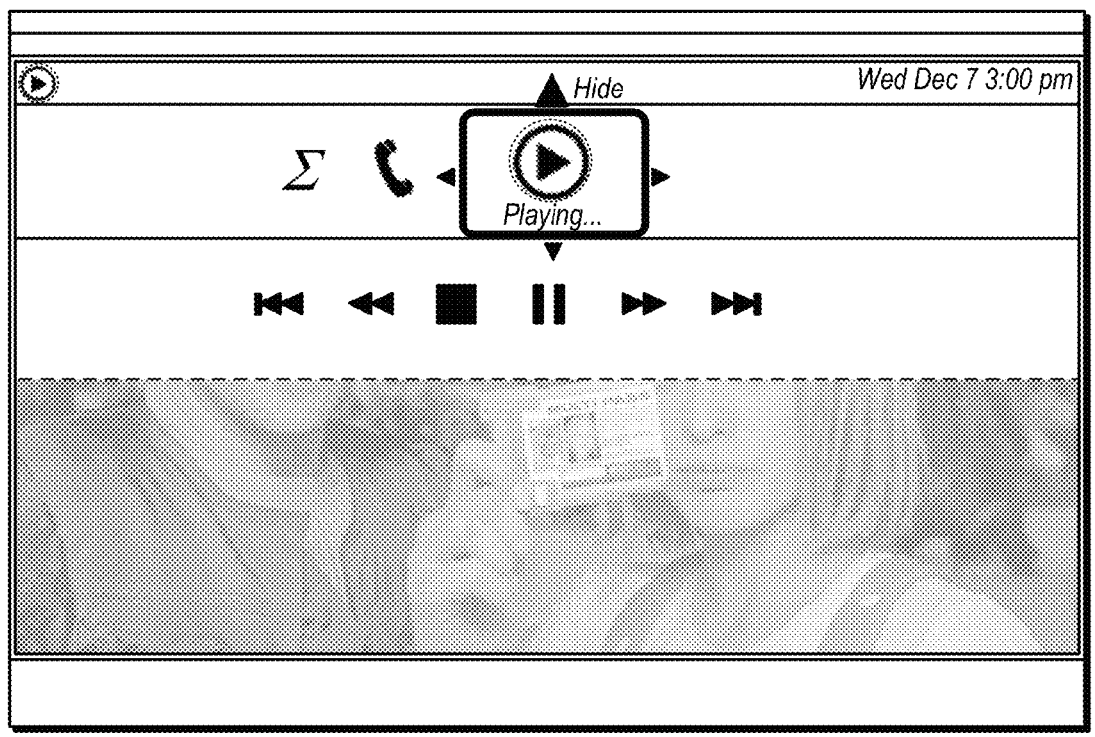
Figure 12D:
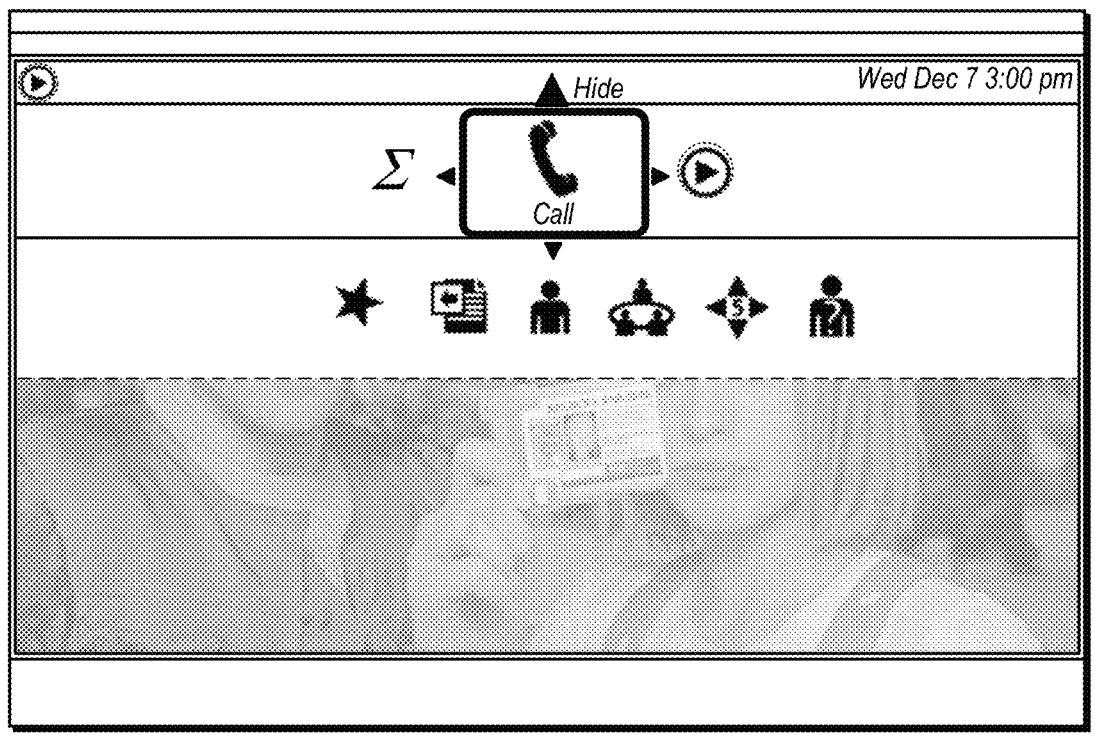
Figure 12E:
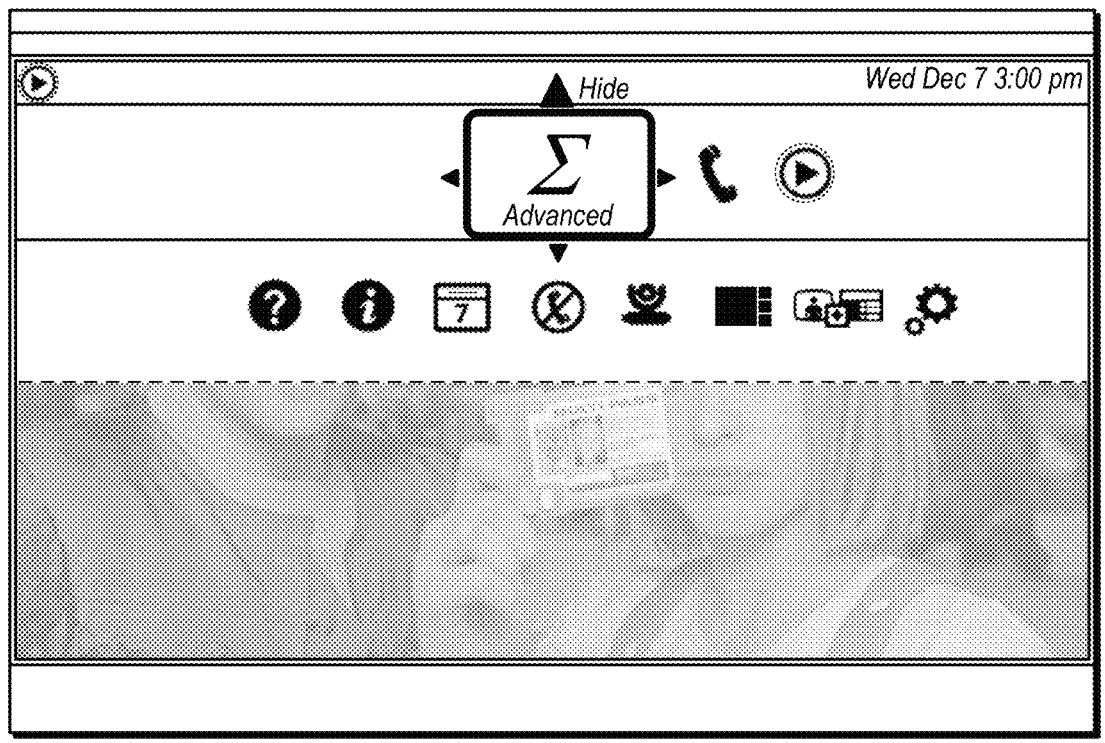
Figure 12F:
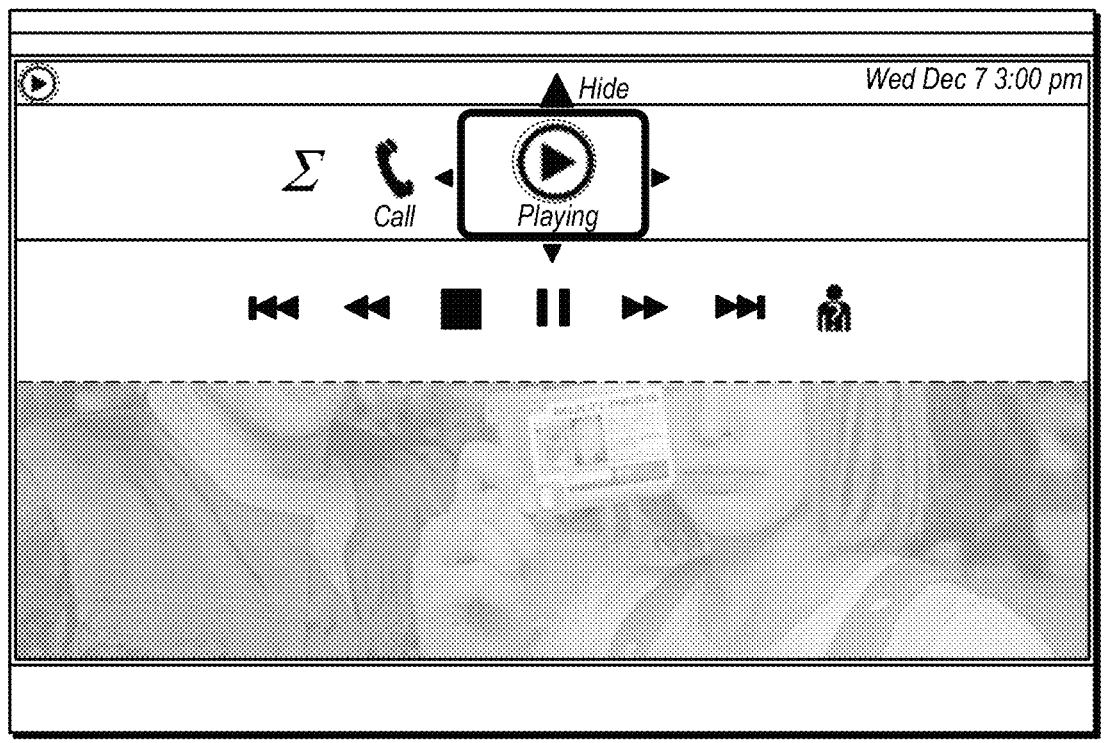
Figure 12G:
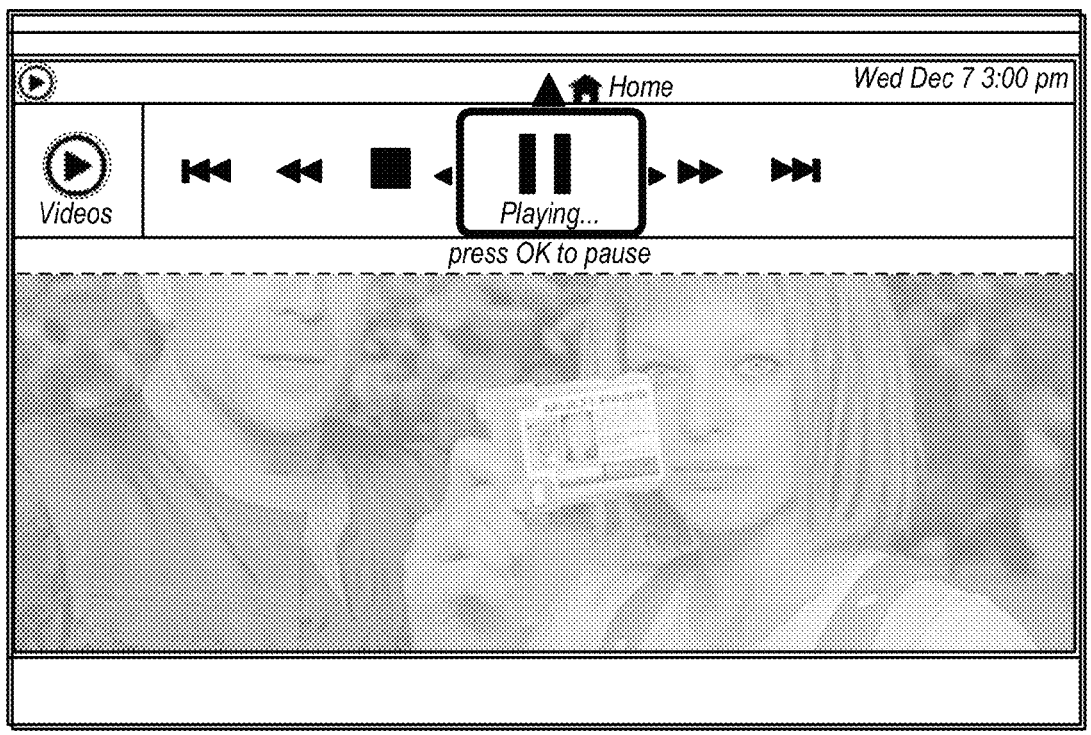
Figure 12H:
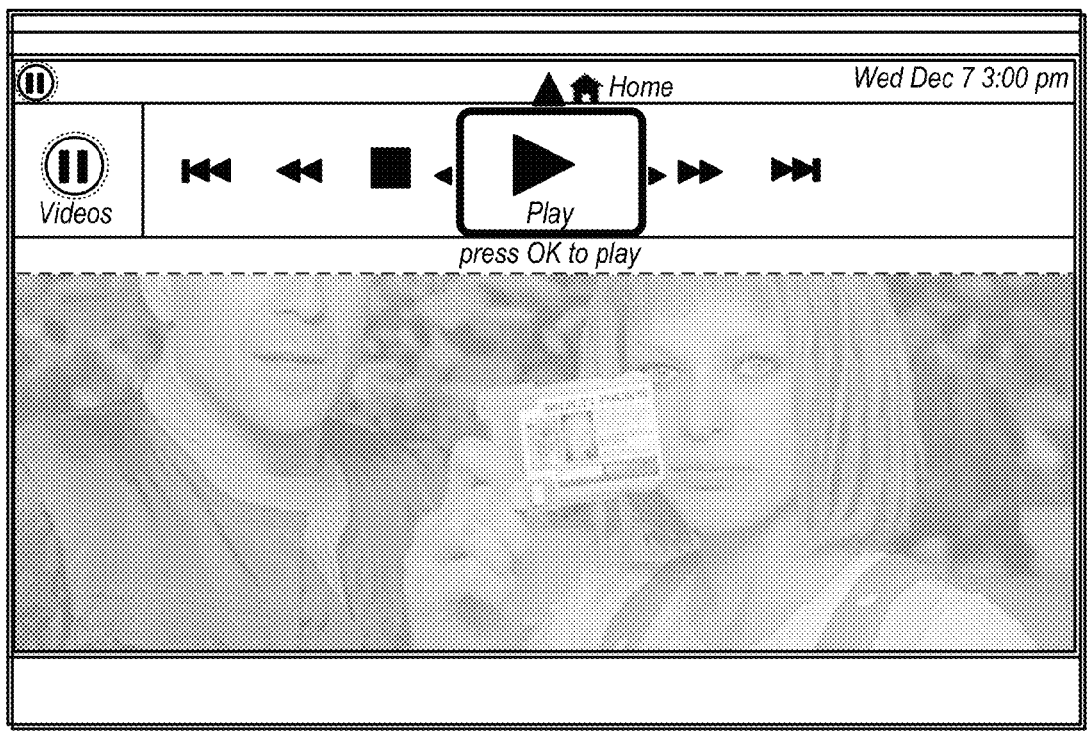

Finally, FIGS. 12A-12H illustrate modification of a user interface based on initiation of a video. As shown in FIG. 12A, the user has selected the "videos" icon from the top level menu. In FIG. 12B, the user has selected the video "The Fifth Element". In FIG. 12C, after initiating playback of the video, the user interface is modified to include playback controls, adding or removing calls (as shown in FIG. 12D), or advanced, e.g., which includes the previous top level icons, shown in FIG. 12E. In FIG. 12F, the user has returned to the playback menu. Finally, FIGS. 12G and 12H indicate that the icon for the playback menu may toggle between paused and playing, depending on the current state of video playback.

Figure 13:
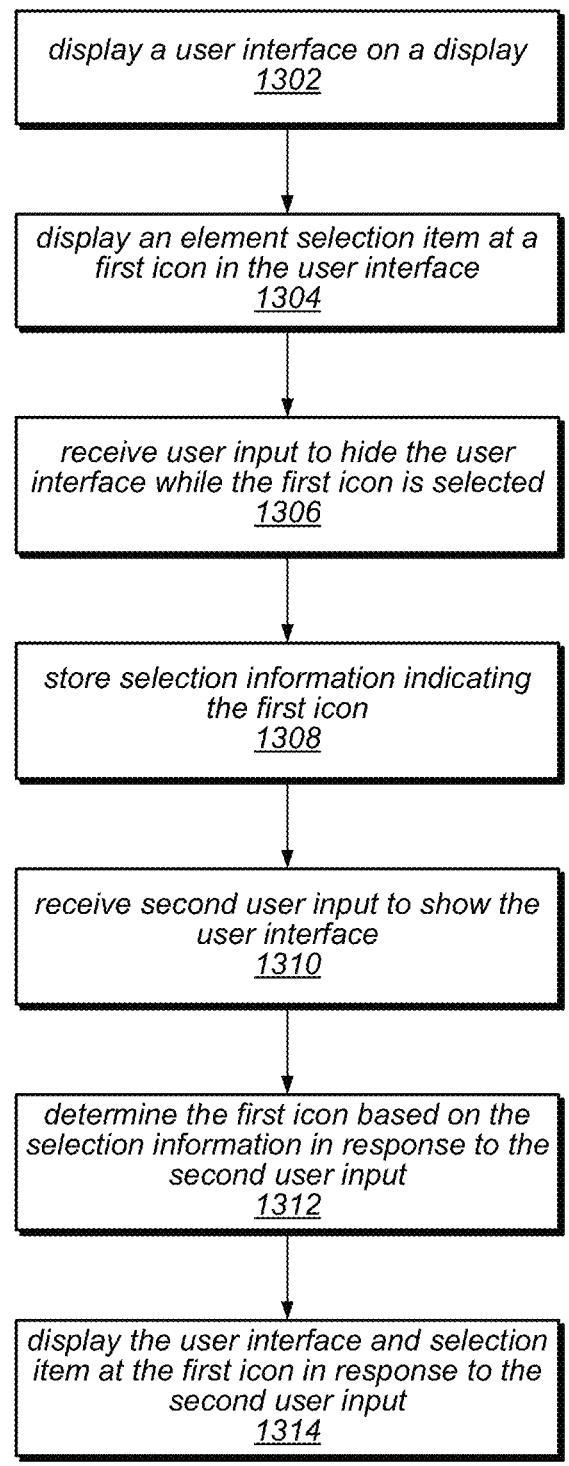
FIG. 13 is a flowchart diagram illustrating an embodiment of a method for hiding a user interface in response to user input.

FIG. 13—Hiding a User Interface in Response to User Input

FIG. 13 illustrates an embodiment of a method for hiding a user interface in response to user input. The method shown in FIG. 13 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, the method may operate as follows.

Initially, in 1302, a user interface may be displayed, similar to 702 above. The user interface may include a first row of icons on the display (e.g., a top level set of icons). Additionally, the user interface may include other rows (e.g., second rows or sub-rows underneath an icon in the first row if icons).

In 1304, an element selection item may be displayed at a first icon. For example, the user may have provided user input to select the first icon, e.g., using a remote control device, such as the one shown in FIG. 3. In one embodiment, the first icon may be one of the icons in the first row of icons (e.g., at the top level). However, the first icon may be part of another row of icons, e.g., beneath the top level, as desired.

In 1306, first input may be received from a remote control to hide the user interface while the first icon is selected. For example, the first input may include directional input from the user. In one specific embodiment, the first icon may be at the top level and the directional input may be "up" directional input (e.g., where the top level icons are shown at the top of the user interface). Alternatively, if the icons are positioned at other portions of the screen (e.g., left, bottom, right), then the input may be received in those directions to hide the screen. Generally, the directional input that is used to hide the icons or user interface is the one that would have no other function given the location of the element selection item. Alternatively, the remote control device may include a "menu" or other input that may be used to hide the user interface. Thus, input may be received to hide the user interface.

In response, in 1308, selection information may be stored which indicates that the first icon is currently selected and/or otherwise stores the current state of the user interface. This selection information may be stored as state information for later use, e.g., for when the user interface is redisplayed in 1312 below.

In 1310, second input may be received from the remote control to display the user interface. The second input may be any of a variety of inputs. For example, in one embodiment, any input may cause the user interface to be displayed. Alternatively, only a subset of the inputs may be used to cause the user interface to be displayed (e.g., excluding the "mute" input for the remote control device of FIG. 3). For example, the directional inputs and/or the confirmation input may be used to cause the user interface to be displayed. In one specific embodiment, the directional input opposite the one discussed above (e.g., "down" versus the previously discussed "up" input) may be used to cause the user interface to be redisplayed. In embodiments where the remote control device includes a "menu" input (or similar input), the same input may be used to cause the user interface to be redisplayed.

In 1312, the first icon may be determined using the selection information. More specifically, the selection information may be used to determine which icon was previously selected in the user interface. Further, in embodiments where the user interface is able to be hidden at a level other than the top level (e.g., other than the first row of icons), the determination of the selected icon may be used to determine which level of the user interface should be shown (e.g., to determine which state the user interface should be in when redisplayed).

In 1314, the user interface may be redisplayed in response to the user input of 1310. Where the user interface included rows of icons and the first icon was among the first row of icons, the first row of icons may be redisplayed in response to the user input of 1310. Moreover, the element selection item may be displayed at the first icon based on the determination of 1312.

The method of FIG. 13 may provide several advantages for hiding the user interface. For example, when using directional inputs to hide the interface, a "menu" input may not be required for the remote control device, thus allowing the remote control device to be as simple as possible, which may be desirable. Additionally, a "hide" menu item is no longer required in the user interface and can be performed easily by the user. Further, the position of the element selection item may be maintained when the user interface is redisplayed, since the user did not have to select a different menu item to hide the user interface. Thus, the above described method may allow for a better and more efficient user experience.

Moreover, while the above descriptions focus on user interfaces which include various rows of icons, such as those previously described, other types of user interfaces are also envisioned, e.g., which are not arranged in rows. Thus, the method of FIG. 13 is not limited to any one particular type of user interface.

FIGS. 14A-14I—Exemplary Interfaces Corresponding to FIG. 13

FIGS. 14A-14I are exemplary user interfaces which correspond to one embodiment of the method of FIG. 13. More specifically, these user interfaces correspond to an embodiment involving videoconferencing. These graphical user interfaces are provided as examples only and do not limit any of the embodiments described above.

Figure 14A:
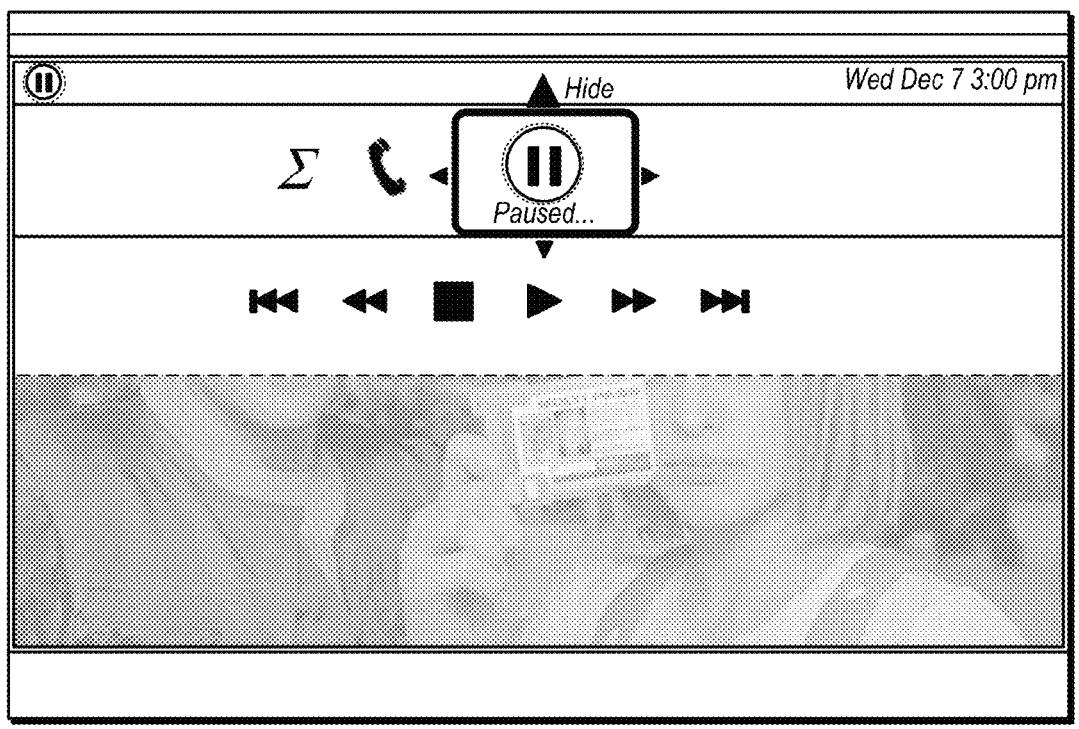
FIGS. 14A-14I illustrate exemplary interfaces corresponding to FIG. 13, according to one embodiment.
Figure 14B:
Figure 14C:
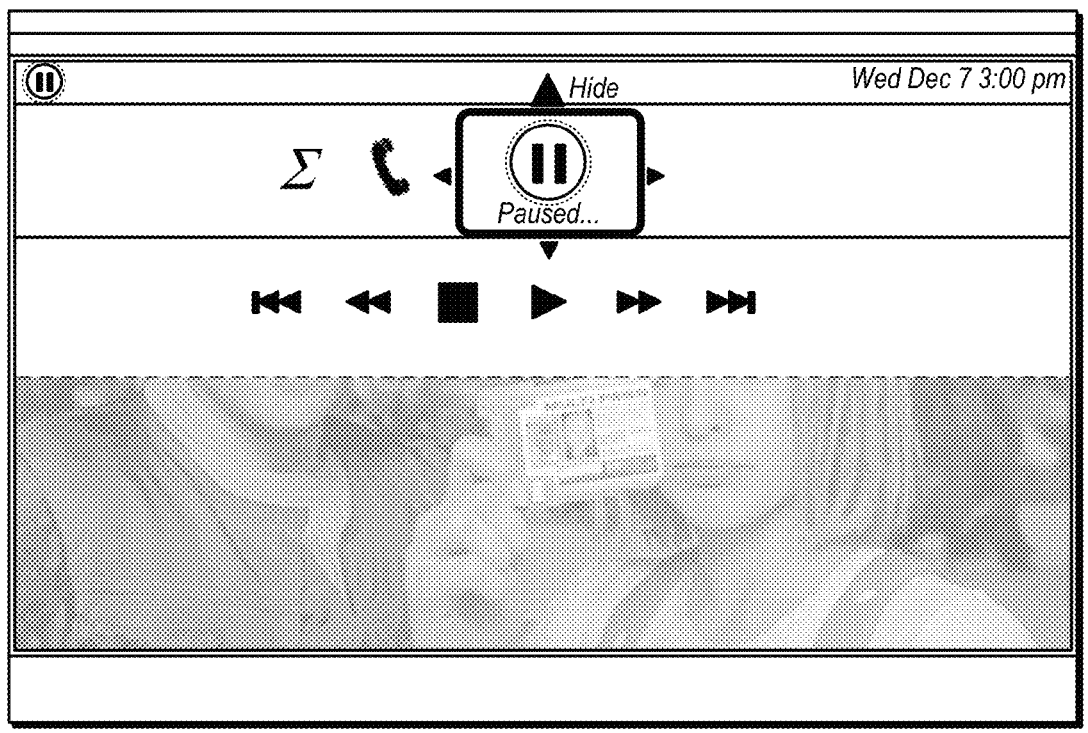

As shown in FIG. 14A, a video (in this case, "The Fifth Element", continuing from the example of FIGS. 12A-12H) is shown. Additionally, the video user interface is displayed over the video. As indicated by the "up arrow" and the text "hide", by providing the "up" directional input, the user may hide the user interface. In response to this user input, in FIG. 14B, the user interface is hidden. In FIG. 14C, the user has provided input to redisplay the user interface. For example, the user may provide the "down" directional input, another input, or, in some embodiments, any use of the remote control may cause the user interface displayed (e.g., except perhaps the "mute" input). In response, the user input is redisplayed, and the previously selected item (the playback menu) is again selected.

Figure 14D:
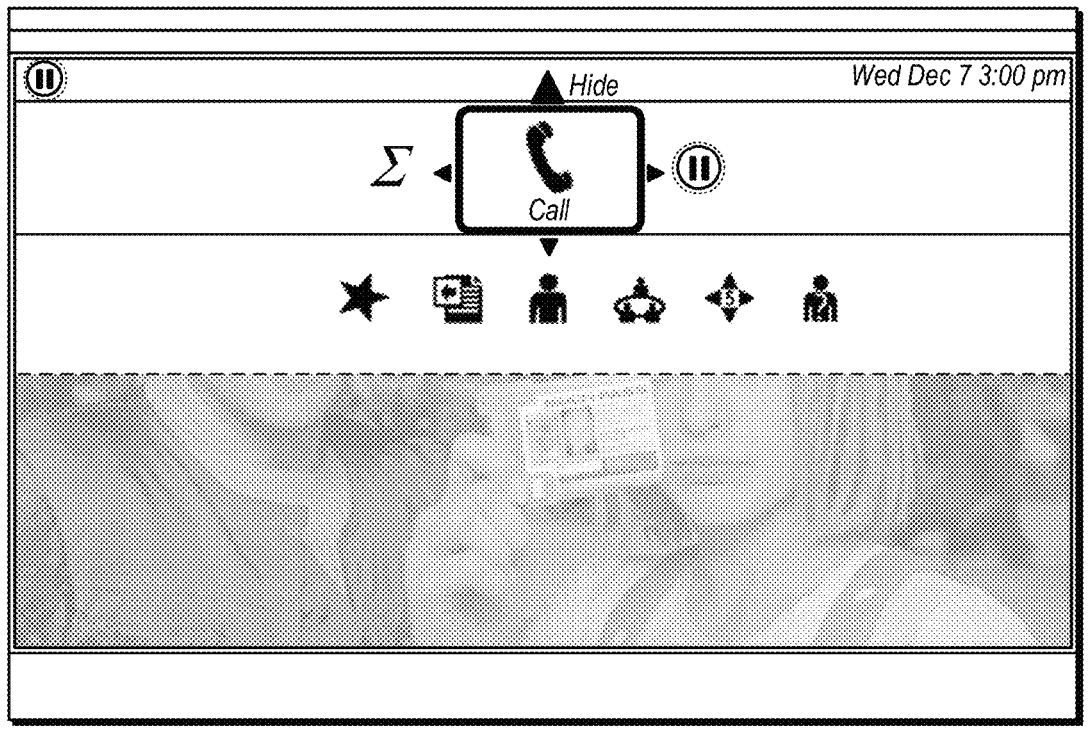
Figure 14E:
Figure 14F:
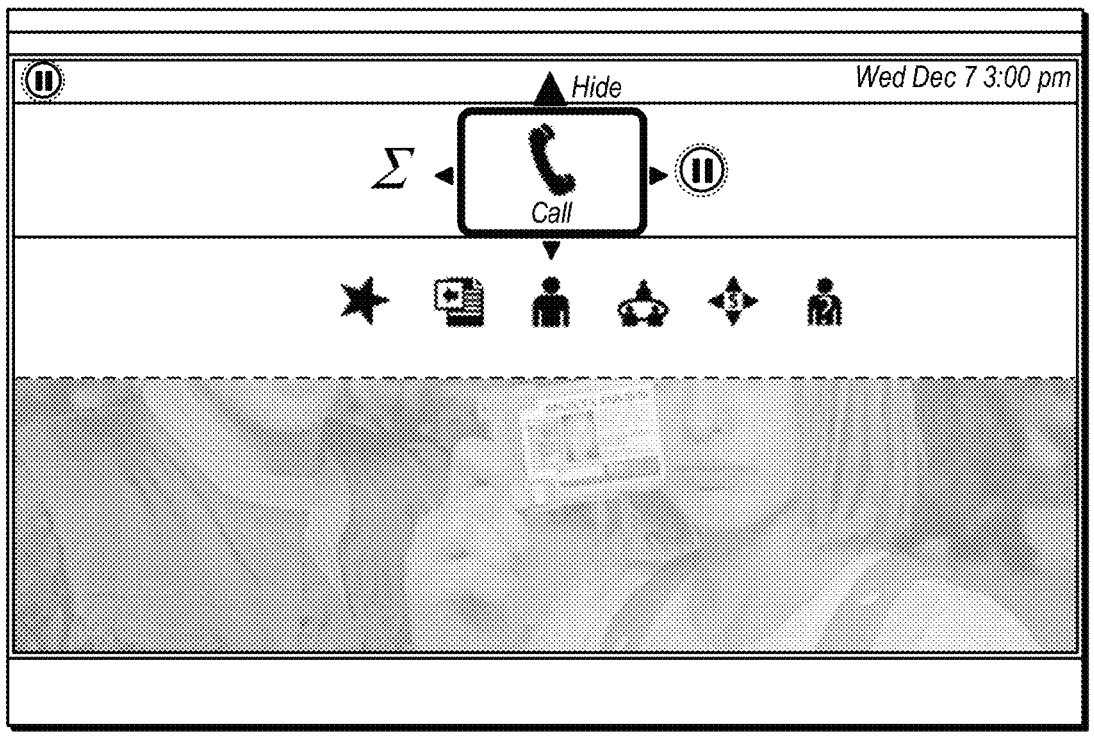
Figure 14G:
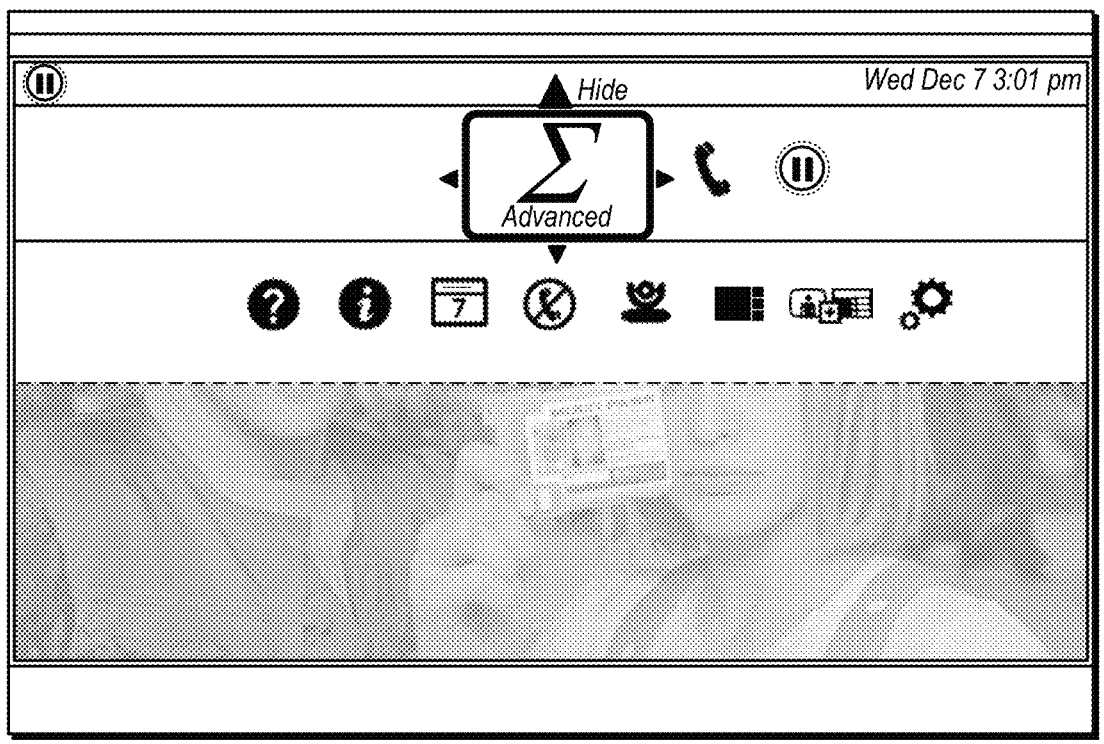
Figure 14H:
Figure 14I:
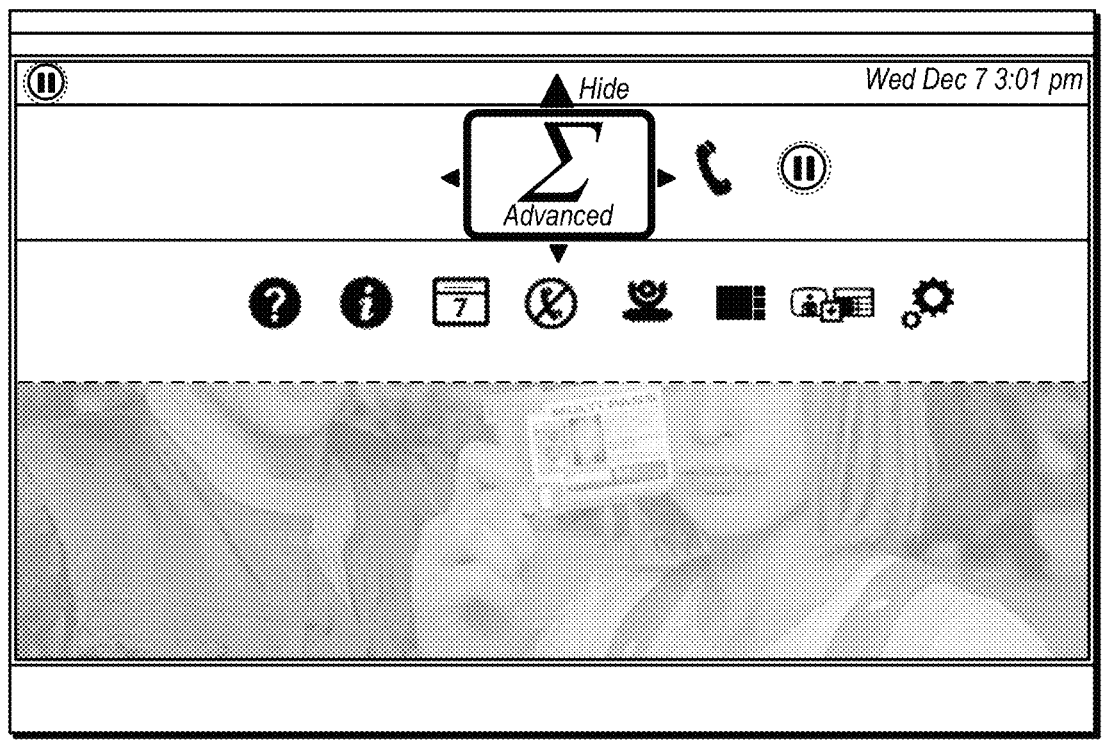

In FIGS. 14D-14F, the user has selected the "call" menu, hidden the user interface, and caused it to redisplay. Similar to the previous set of Figures, the user interface is redisplayed having the selection item at the same location as when it was previously hidden. Similarly, the menu is remembers the location in FIGS. 14G-14I, where the user selects the "advanced" menu.

Figure 15:
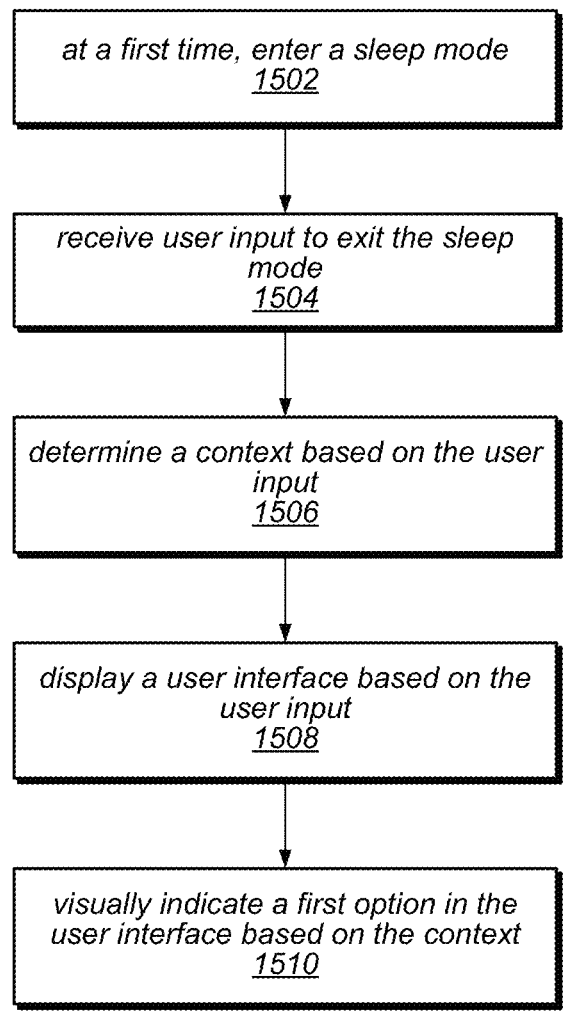
FIG. 15 is a flowchart diagram illustrating an embodiment of a method for providing a user interface which wakes from sleep in a context sensitive manner.

FIG. 15—User Interface with Context Sensitive Wake

FIG. 15 illustrates an embodiment of a method for providing a user interface which wakes from sleep in a context sensitive manner. The method shown in FIG. 15 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, the method may operate as follows.

In 1502, at a first time, a device may enter a sleep mode. For example, user input may be received to cause the device (e.g., which may be a videoconferencing unit) to enter the sleep mode. In one embodiment, the user input may be received via a remote control device, e.g., selecting an icon from the user interface to enter the sleep mode.

However, the sleep mode may be entered in response to other actions or triggers. For example, the device may be configured to enter the sleep mode when inactive or after a certain period of inactivity (e.g., inactivity of the user and/or inactivity of the device itself). More specifically, the device may enter the sleep mode if the user has not interacted with the device in a certain period of time. Alternatively, or additionally, the device may enter the sleep mode if the device is not currently performing a function (e.g., the device may not go to sleep if it is playing a video, performing a videoconference, etc., even if the user has not interacted with the device). In further embodiments, there may be a first threshold for device activity and a second, e.g. longer, threshold for user activity, such as 5 minutes and 30 minutes, respectively.

The device may enter the sleep mode in response to other activities or triggers, as desired. Thus, in 1502, the device may enter the sleep mode at the first time.

In 1504, at a later time, user input may be received to cause the device to exit the sleep mode or wake. Similar to 1310 above, the user input may involve any number of possible inputs from a remote control device, whether it be a particular input, a particular subset of inputs, a combination of inputs, or any input, as desired. For example, the user may provide directional user input or "confirmation" input to cause the device to wake. In further embodiments, the user input may be received to the device itself (e.g., pressing a dedicated sleep/wake input, a power input, etc.).

In further embodiments, the device may wake automatically, e.g., in response to detecting the user's presence or in response to other stimuli. For example, the device may be configured to detect the user's presence using any of the embodiments discussed in U.S. patent application Ser. Nos. 13/194,655, 13/093,948, and/or 12/724,226, all of which were incorporated by reference in their entirety above.

In 1506, a context may be determined in response to the user input of 1504. Determining the context may involve determining a current state of the device and/or the state of the device at the first time.

For example, the device may have previously been placed in one or more modes, e.g., in response to user input. For example, the user may have invoked a "do not disturb" mode and the device may have entered the sleep mode while the "do not disturb" mode was still active. Accordingly, determining the context may include determining that the "do not disturb" mode was/is active. Similar embodiments may apply to other modes, e.g., if the device was previously muted. Additional states or modes may be based on system health conditions (e.g., no network connectivity), rejoin a conference, join a scheduled meeting, etc.

In another embodiment, the device may have previously joined a conference (e.g., assuming the device is a conferencing device, such as a videoconferencing unit). Accordingly, the method may determine 1) that the device had previously joined the conference and 2) that the conference is still active. Accordingly, determining the context may involve determining that the device can rejoin a previously joined conference. Further details regarding rejoining a previously joined videoconference are provided below, regarding FIG. 17.

In another embodiment, determining the context may involve analyzing a schedule associated with the device or user (e.g., a conferencing schedule, TV schedule, etc.). Accordingly, the method may determine whether a scheduled activity (e.g., videoconference, TV show, movie, etc.) is currently underway or is about to be underway (e.g., within the next minute, 5 minutes, 10 minutes, etc.). Thus, determining the context may involve analysis of scheduled activities and/or the proximity of those activities to the current time.

In further embodiments, the determination of the context may be similar to the determination discussed above in 904, although other determinations of context are envisioned.

Additionally, where more than one of the above modes or situations are present (e.g., where "do not disturb" and a previously joined conference is available), the determination of context may determine a priority between those modes or situations. For example, a previously joined videoconference availability may have a higher priority than the "do not disturb" mode. This priority may be determined based on a previously defined set of rules (e.g., designed or set by the user), dynamically, etc.

Moreover, where the various modes or situations above (or other contexts) are not present, determining the context may include determining that there is a default context (or lack of detected modes or situations). Accordingly, determination of the context may involve determining a "default" context.

Thus, in 1506, the context may be determined in response to the user input in 1504.

In 1508, in response to the user input in 1504, a user interface may be displayed, e.g., including a first row of icons, similar to user interfaces previously discussed. Additionally, in 1510, a element selection item may be displayed which visually indicates an option in the user interface, e.g., a first icon in the first row of icons, based on the context determined in 1506.

For example, where the context includes an active "do not disturb" mode, the visually indicated option may be to deactivate the "do not disturb" mode. Similarly, where there is an available conference that was previously joined, the visually indicated option may be to rejoin that conference. Where a previously scheduled event is underway or proximate to the current time (e.g., within 5 minutes of the current time), an option to activate or join the event may be visually indicated. Further modes and options are envisioned, depending on the context.

As noted above, where more than one mode or activity is available, the one with the highest priority may be visually indicated (e.g., the selection item may be displayed over the icon corresponding the context with the highest priority). However, more than one option may be visually indicated, though the selection item (in embodiments where present) may be displayed over the option that corresponds to the context with highest priority.

In a default context, the selection item may be displayed for a default option or icon (or it may be otherwise visually indicated within the user interface). Alternatively, in the default context, the option that was last used may be selected by default (e.g., similar to redisplaying the user interface described above regarding FIG. 13).

Thus, according to the method of FIG. 15, after waking from sleep, the user interface may be displayed based on a determined context.

FIGS. 16A-16E—Exemplary Interfaces Corresponding to FIG. 15

FIGS. 16A-16E are exemplary user interfaces which correspond to one embodiment of the method of FIG. 15. More specifically, these user interfaces correspond to an embodiment involving videoconferencing. These graphical user interfaces are provided as examples only and do not limit any of the embodiments described above.

Figure 16A:
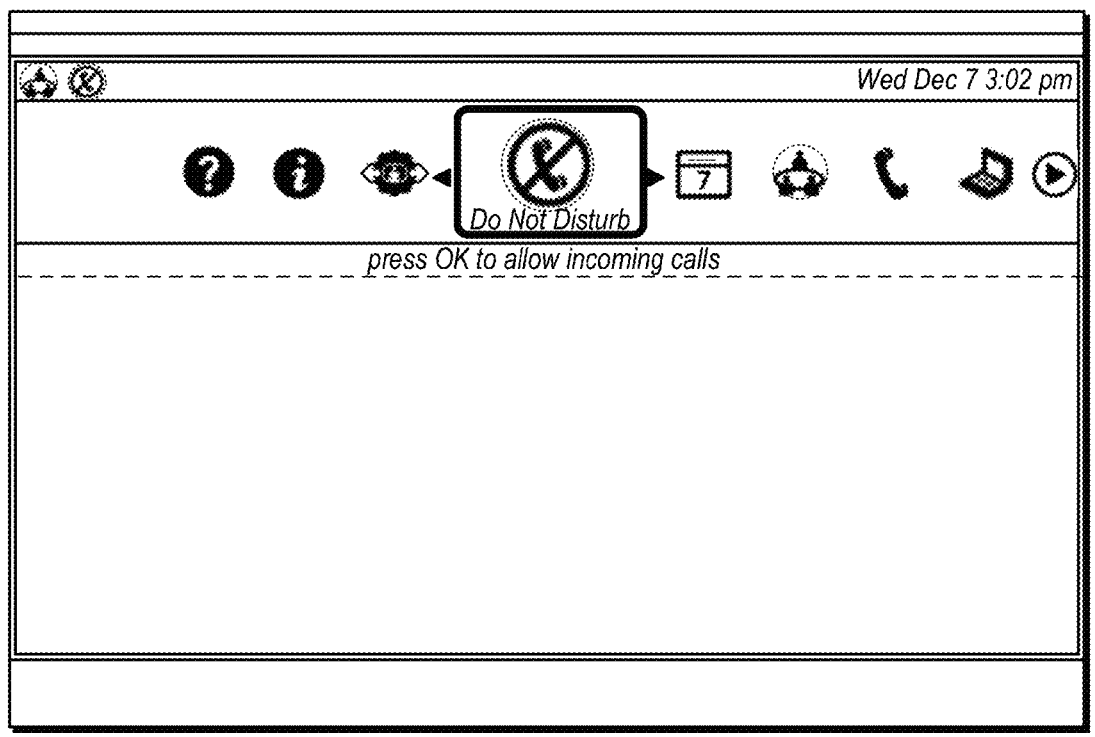
FIGS. 16A-16E illustrate exemplary interfaces corresponding to FIG. 15, according to one embodiment.
Figure 16B:
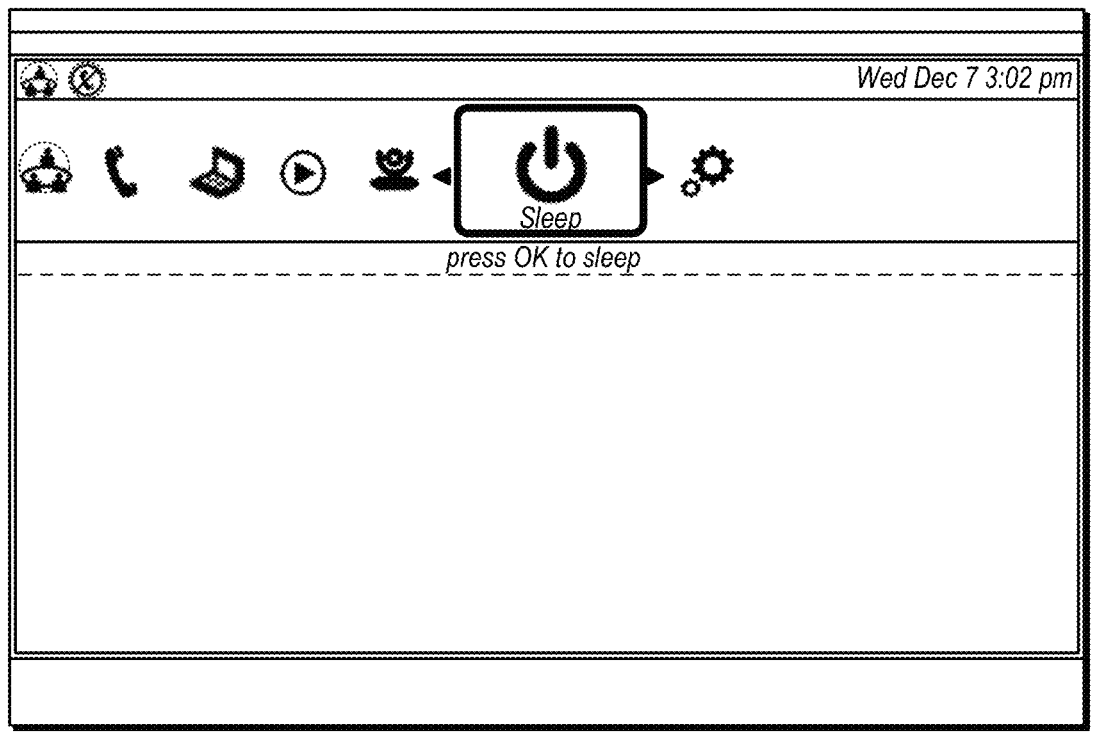

As shown in FIG. 16A, the user has turned on "Do Not Disturb" mode. Additionally, the icon corresponding to "rejoining" a previous meeting (discussed in more detail below) is also indicated, both in the top left hand corner, and by the dotted lines (e.g., which may be some visual indication, such as a green highlight). In FIG. 16B, the user invokes the sleep mode by changing to the icon corresponding to "Sleep" (instead of the "Do Not Disturb" icon). After invoking sleep mode, the device (and correspondingly, the display) goes to "sleep" and video signals may be lacking or may at least not correspond to the user interface (e.g., they may correspond to a screen saver or other images/video).

Figure 16C:
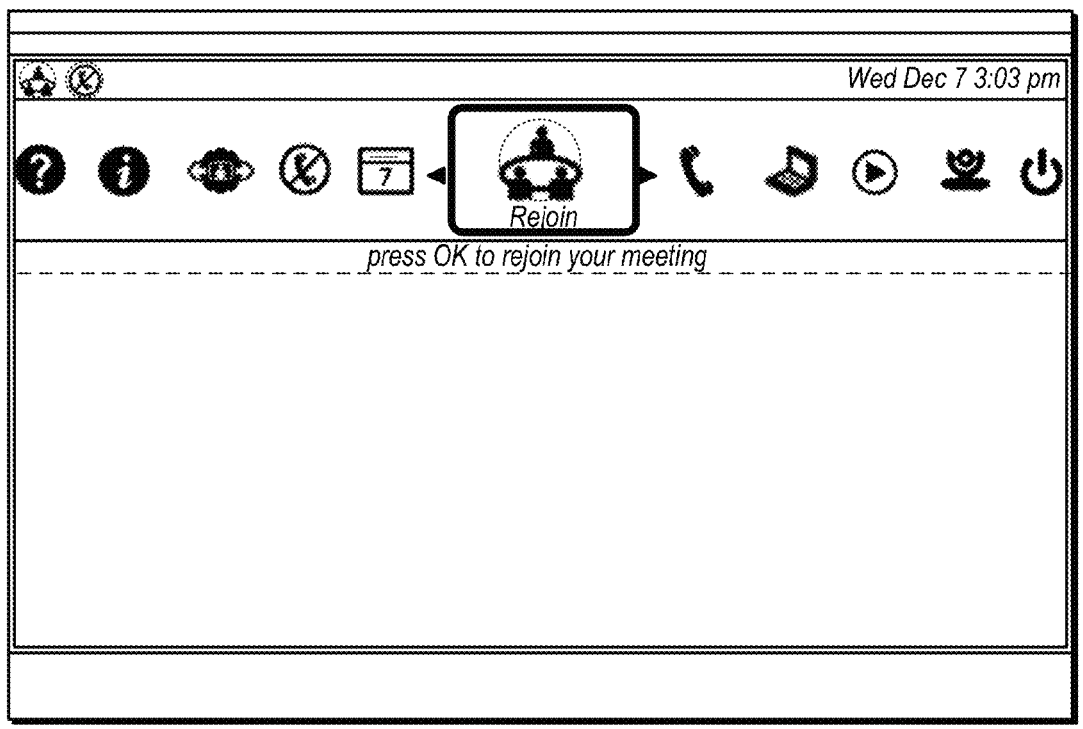

In FIG. 16C, upon waking from the sleep mode, the icon "rejoin" for rejoining a previous videoconference is selected. This option may be selected ahead of "Do Not Disturb" since it may generally have a higher priority (e.g., the user may desire to choose to rejoin the videoconference rather than turn off the "Do Not Disturb" mode upon waking).

Figure 16D:
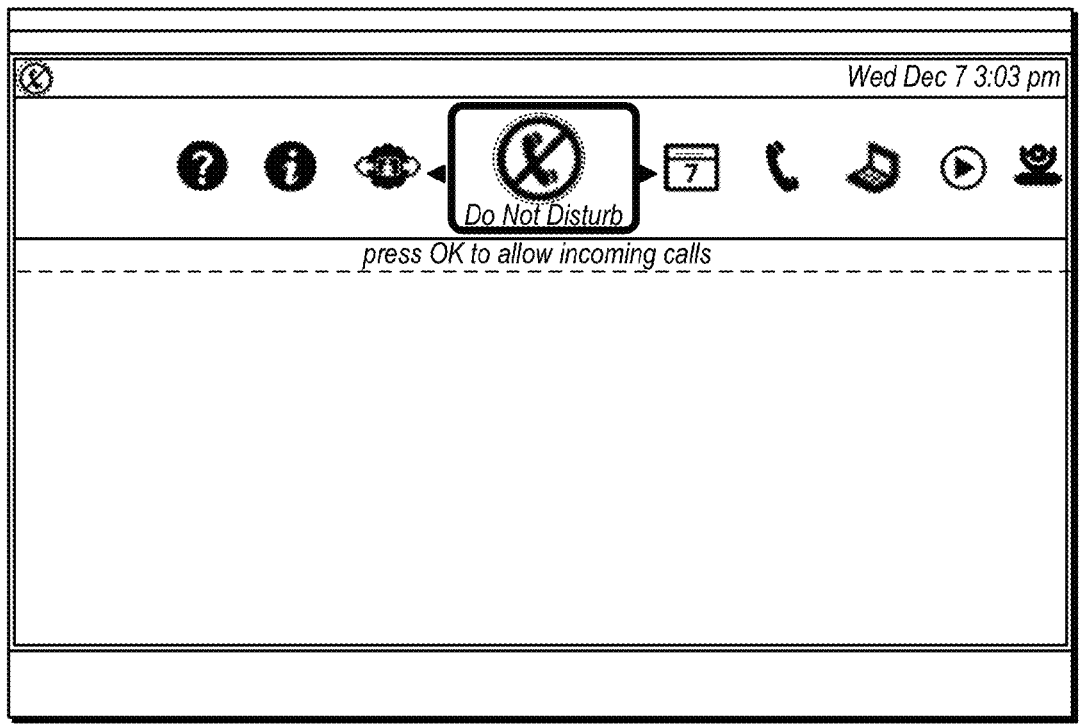
Figure 16E:
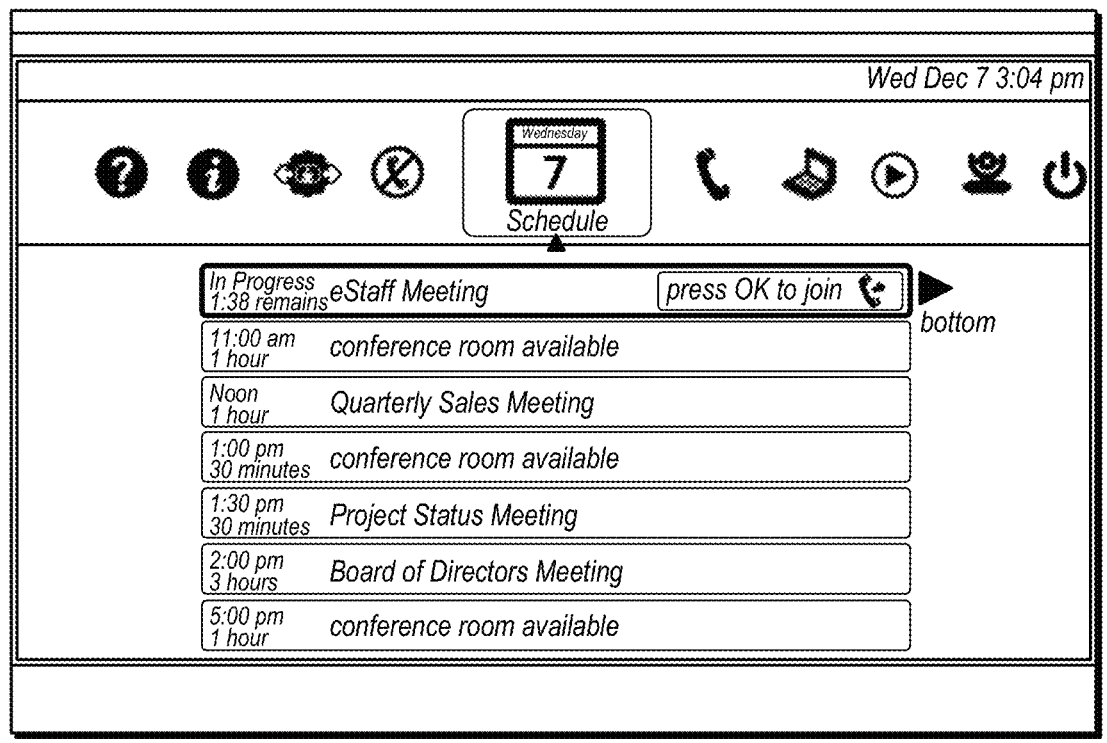

In FIG. 16D, the "rejoin" option is not available, so upon waking, the "Do Not Disturb" icon is selected, e.g., so that the user may turn off "Do Not Disturb". Finally, in FIG. 16E, where both the "rejoin" option is not available and the "Do Not Disturb" mode is not invoked, upon waking, the user interface shows the schedule item selected. In some embodiments, this may simply be the default option, or, in this case, it may be selected since the "eStaff Meeting" is already underway.

Thus, depending on different contexts, different options or icons may be selected upon waking from sleep mode.

Figure 17:
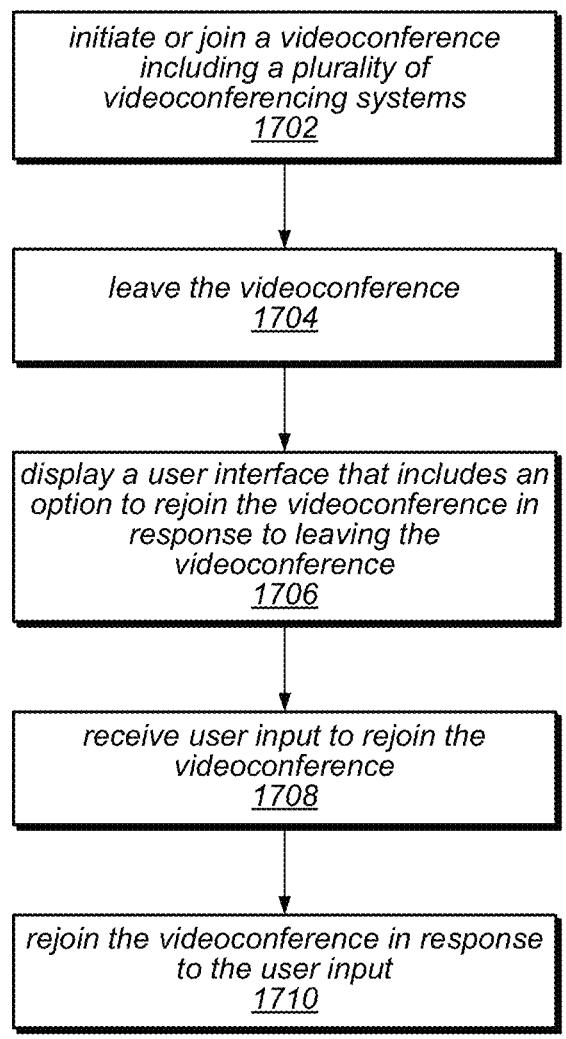
FIG. 17 is a flowchart diagram illustrating an embodiment of a method for rejoining a previously joined videoconference.

FIG. 17—Rejoining a Previously Joined Videoconference

FIG. 17 illustrates an embodiment of a method for rejoining a previously joined videoconference. The method shown in FIG. 17 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, the method may operate as follows.

In 1702, a videoconference may be initiated between a plurality of videoconferencing systems, e.g., at least three videoconferencing systems. The videoconference may be initiated and/or performed in the manner described in various U.S. patent applications incorporated by reference above, such as U.S. patent application Ser. No. 11/252,238.

The videoconference may be initially hosted by one of the videoconferencing systems involved in the videoconference, e.g., one of the videoconferencing systems may act as an MCU of the videoconference. In some embodiments, the videoconference may be transferred from one of the videoconferencing systems to a server, which may act as MCU for the videoconference. For example, the videoconference may have been initially hosted by a first videoconferencing system, which may perform the method elements below, and then may be hosted by one or more servers. However, the videoconference may be initially hosted by a different videoconferencing system, as desired. The transfer of the videoconference from the hosting videoconferencing system to the one or more servers may be performed in a transparent or seamless manner—that is, participants in the videoconference may not be aware that the transfer has occurred. Alternatively, instead of initially being hosted by one of the videoconferencing systems, the videoconference may have been hosted by one or more servers. Thus, in one embodiment, the videoconference may be hosted in the "cloud".

In 1704, the first videoconferencing system may leave the videoconference. The first videoconferencing system may leave the videoconference for a variety of reasons. For example, a user of the first videoconferencing system may provide input to the videoconferencing system to leave the videoconference, e.g., using a user interface similar to those discussed herein. Alternatively, the first videoconferencing system may leave the videoconference for technical reasons, e.g., due to a network or bandwidth issue.

In some embodiments, as discussed above, the first videoconferencing system may have initially hosted the videoconference. The videoconference may have been previously transferred to one or more servers (or another videoconferencing system) after initiation. Alternatively, the transfer may occur upon the first videoconferencing system leaving the videoconference in 1704. Similar to above, this transfer may be performed in a transparent or seamless manner. However, in one embodiment, the first videoconferencing system may not have hosted the videoconference.

The videoconference may continue between others of the videoconferencing systems after the first videoconferencing system has left the videoconference in 1704.

In 1706, the first videoconferencing unit may display a user interface which includes an option to rejoin the videoconference, in response to the first videoconferencing system leaving the videoconference in 1704. For example, the user interface may be similar to those described above and may include an icon in a row of icons (e.g., the top level row of icons) that enables the user to rejoin the videoconference, e.g., while the videoconference is continuing or available to be rejoined.

In some embodiments, the option to rejoin the videoconference may only be present for a threshold period of time, e.g., 1 minute, 5 minutes, 10 minutes, and may disappear from the user interface after the threshold has been reached. Note that the option to rejoin the videoconference may be removed from the user interface prior to completion of the videoconference. Additionally, the option to rejoin the videoconference may only be present while the videoconference is still available.

In 1708, user input may be received to rejoin the videoconference using the option displayed in 1706. For example, the user may select the option using a remote control device, such as the one shown in FIG. 3.

In 1710, the first videoconferencing system may rejoin the videoconference in response to the user input in 1708. The first videoconferencing system may rejoin the videoconference using methods typically used for joining videoconferences.

Thus, in the method of FIG. 17, a user may be able to rejoin a previously joined videoconference that is still underway, unlike prior systems which did not or could not provide such a possibility.

Figure 18A:
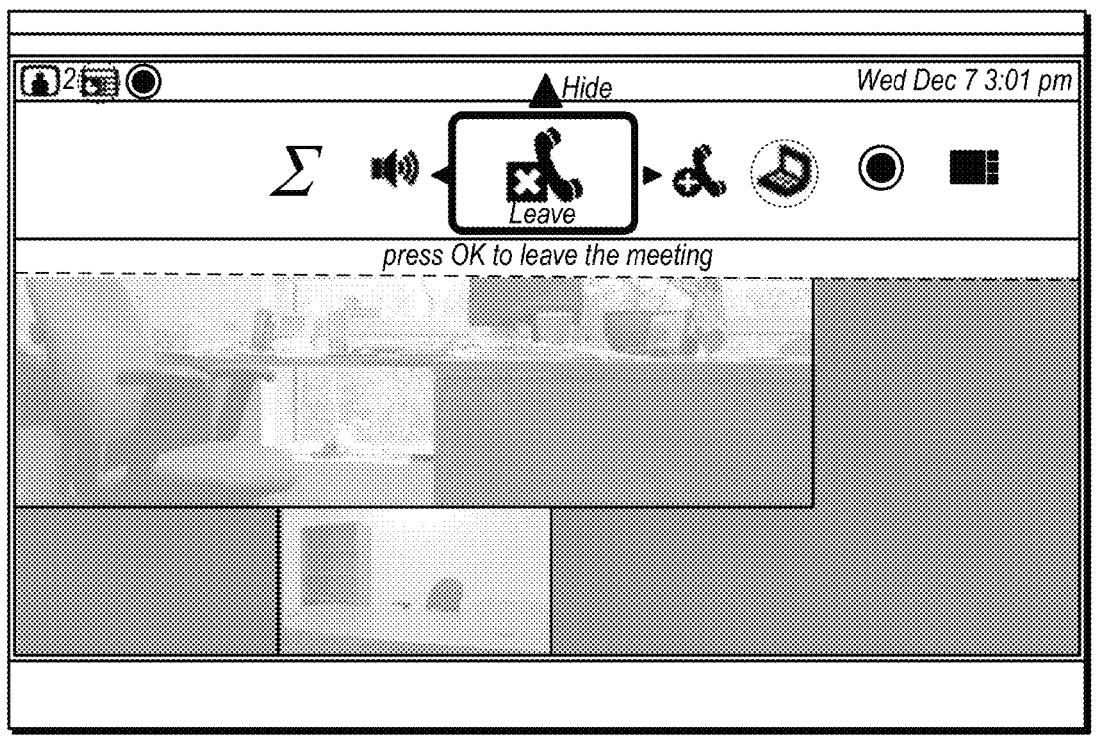
FIGS. 18A-18B illustrate exemplary interfaces corresponding to FIG. 17, according to one embodiment.
Figure 18B:
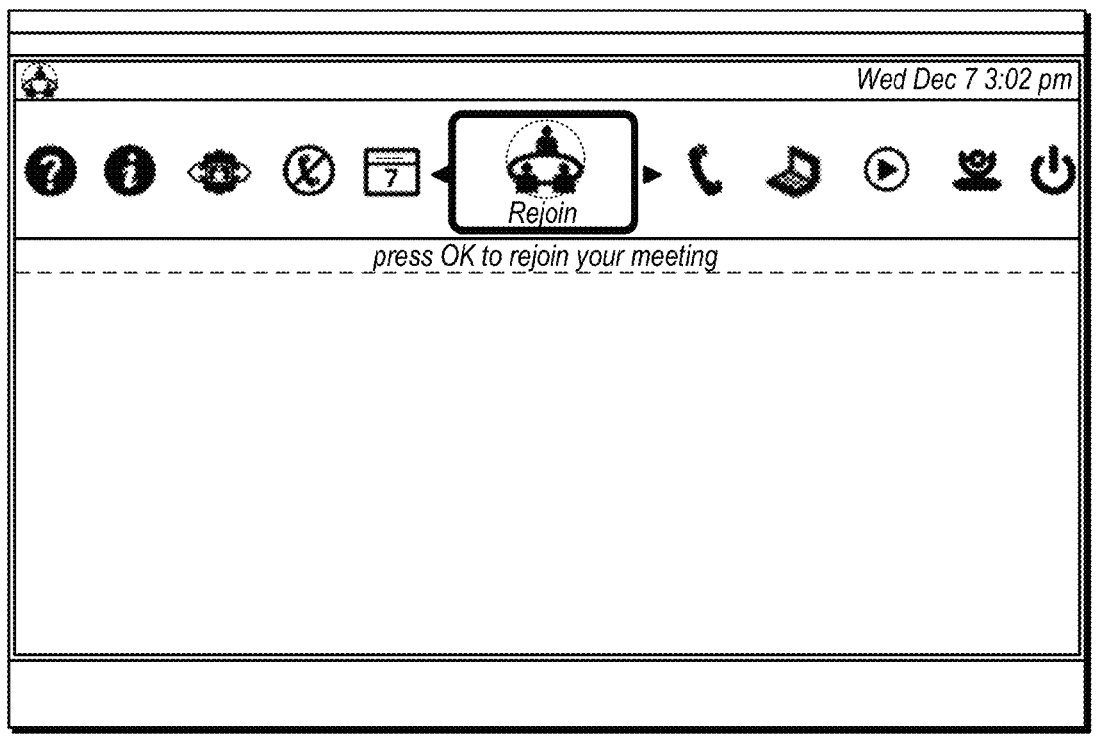

FIGS. 18A-18B—Exemplary Interfaces Corresponding to FIG. 17

FIGS. 18A-18B are exemplary user interfaces which correspond to one embodiment of the method of FIG. 17. More specifically, these user interfaces correspond to an embodiment involving videoconferencing. These graphical user interfaces are provided as examples only and do not limit any of the embodiments described above.

In FIG. 18A, the user has selected the option to leave a current videoconference. In FIG. 18B, after leaving the videoconference, a menu option to rejoin the previous videoconference is made available in the user interface (e.g., at the top level).

Figure 19:
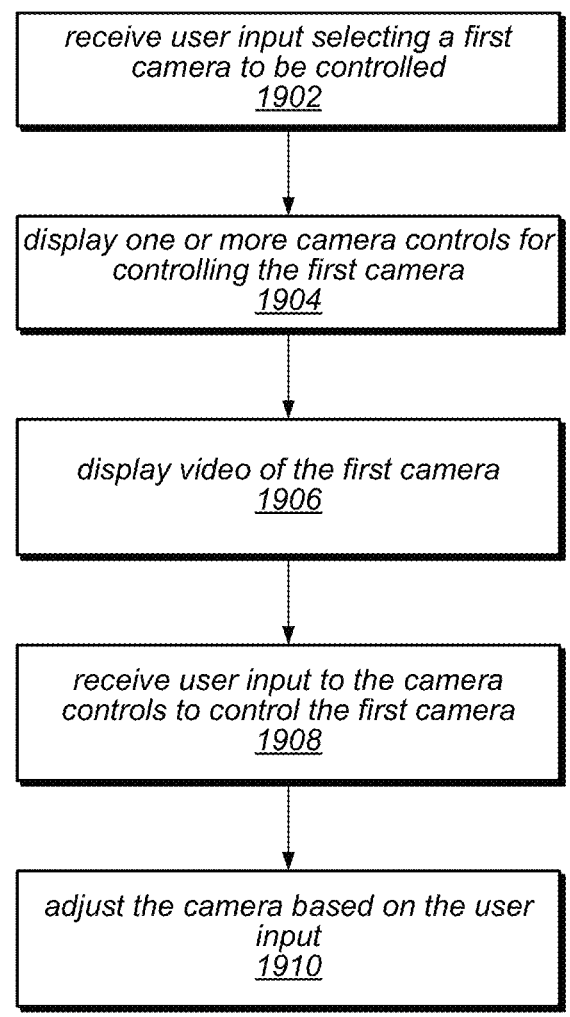
FIG. 19 is a flowchart diagram illustrating an embodiment of a method for providing a user interface for controlling a camera whose video is not currently displayed.

FIG. 19—Controlling a Camera that is not Currently Displayed

FIG. 19 illustrates an embodiment of a method for providing a user interface for controlling a camera whose video is not currently displayed. The method shown in FIG. 19 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 1902, user input may be received selecting a first camera to be controlled. In one embodiment, a user may provide the user input to select the first camera using a user interface, e.g., which may be displayed on a display similar to 702 above.

Video of the selected camera may not be currently displayed to the user making the selection. For example, the user providing the input may be at a first videoconferencing system, which may be showing video of different camera(s) (e.g., of other videoconferencing locations, a local camera at the first videoconferencing system, etc.), a presentation, and/or any video not provided by the first camera.

Accordingly, based on the selection in 1902, in 1904, one or more camera controls for controlling the first camera may be displayed. For example, these camera control(s) may be used to control pan and tilt and/or zoom of the first camera.

In one particular embodiment, the displayed camera controls may be similar to those described in U.S. patent application Ser. No. 13/327,904, which was incorporated by reference above. More specifically, in such an embodiment, a first input control and a second input control for controlling pan and tilt or zoom of a camera, respectively, may be displayed. More specifically, the first input control for controlling the pan of the camera may be displayed at a first location in the user interface (shown on the display) and the second input control for controlling the tilt or zoom of the camera may be displayed at a second location in the user interface.

In some embodiments, the first and second input controls may be displayed in response to selection of a camera. For example, the user may select a camera to control from a plurality of various cameras. Accordingly, in response to selection (e.g., and confirmation) of the camera, the first and second input controls may be displayed.

The first input control may be displayed as an icon in the user interface. Additionally, the icon may visually indicate that it may be used to control pan and tilt of the camera. For example, the icon may include a picture of a camera with arrows around it to indicate possible movement. Similarly, the second input control may be displayed as an icon in the user interface that visually indicates that it may be used to control the zoom of the camera. For example, the icon may include a picture of a magnifying glass, typically used to indicate zoom functionality.

Additionally, based on the selection in 1902, in 1906, video of the first camera may be displayed, e.g., so that the user can now see the video of the first camera while controlling the camera, thereby providing visual feedback as the user provides input to control the first camera.

In 1908, user input may be received to control the first camera. For example, the user may use a remote control, such as the one shown in FIG. 3, to provide input to the displayed camera controls. In one embodiment, the user may provide input to control the pan and tilt and/or zoom of the first camera using the camera controls.

For example, following the particular embodiment discussed above, first directional input selecting an input control may be received. More specifically, in one embodiment, the user may use directional input in order to cause the selection item to select one of the input controls.

Additionally, user input indicating acceptance of the selected input control may be received. For example, after selection in 1104, the user may provide input confirming selection of the input control, e.g., via a confirmation input of the remote control device. Note that the user may be able to deselect one of these input controls by providing confirmation input.

Further, second directional input to adjust the camera may be received. More specifically, where the user has selected and confirmed the first input control, the second directional input may be received to control the pan or tilt of the camera. In one embodiment, left and right directional input may be used to control pan of the camera while up and down directional input may be used to control tilt of the camera.

Similarly, where the user has selected and confirmed the second input control, the second directional input may be received to control the zoom of the camera. In one embodiment, left and right directional input may be used to decrease and increase zoom, respectively. In a particular embodiment, vertical input may be used to change from controlling the zoom to controlling the pan and tilt of the camera, e.g., without having to deselect the second input control and select the first input control. This change in control may be displayed on the display by changing from displaying the selection item for the second input control to displaying the selection item for the first input control. Thus, in this embodiment, the user may be able to quickly switch from controlling the zoom of the camera to controlling the pan and tilt of the camera. Note that the reverse may not be possible since the first input control may utilize all directional input for controlling pan and tilt.

Note further that the particular direction of the input may be reversed, e.g., where vertical input is used to control zoom and the horizontal input is used to switch from the first control to the second control. Additionally, the direction input orthogonal to the control of the zoom may only work in the direction of the first input control relative to the second input control. For example, where the zoom is controlled using horizontal directional input and the first input control is displayed above the second input control, the switch from the first control to the second control may only occur when the up directional input is provided, although other embodiments are envisioned.

Finally, in 1910, the first camera may be adjusted (e.g., the pan and tilt or zoom of the camera) based on the user input in 1908. More specifically, signals may be provided to the camera to cause the camera to adjust its pan, tilt, or zoom, based on the input received in 1908. Correspondingly, the displayed video of the first camera may provide visual feedback to the user as the input is provided.

Note that the method may further include displaying icons for different camera presets. The user may select these icons (e.g., using directional input) and confirm selection (e.g., by providing confirmation input). In response, the pan and tilt and/or zoom of the camera may be adjusted to the values represented by the camera presets.

FIGS. 20A-20F—Exemplary Interfaces Corresponding to FIG. 19

FIGS. 20A-20F are exemplary user interfaces which correspond to one embodiment of the method of FIG. 19. More specifically, these user interfaces correspond to an embodiment involving videoconferencing. These graphical user interfaces are provided as examples only and do not limit any of the embodiments described above.

Figure 20A:
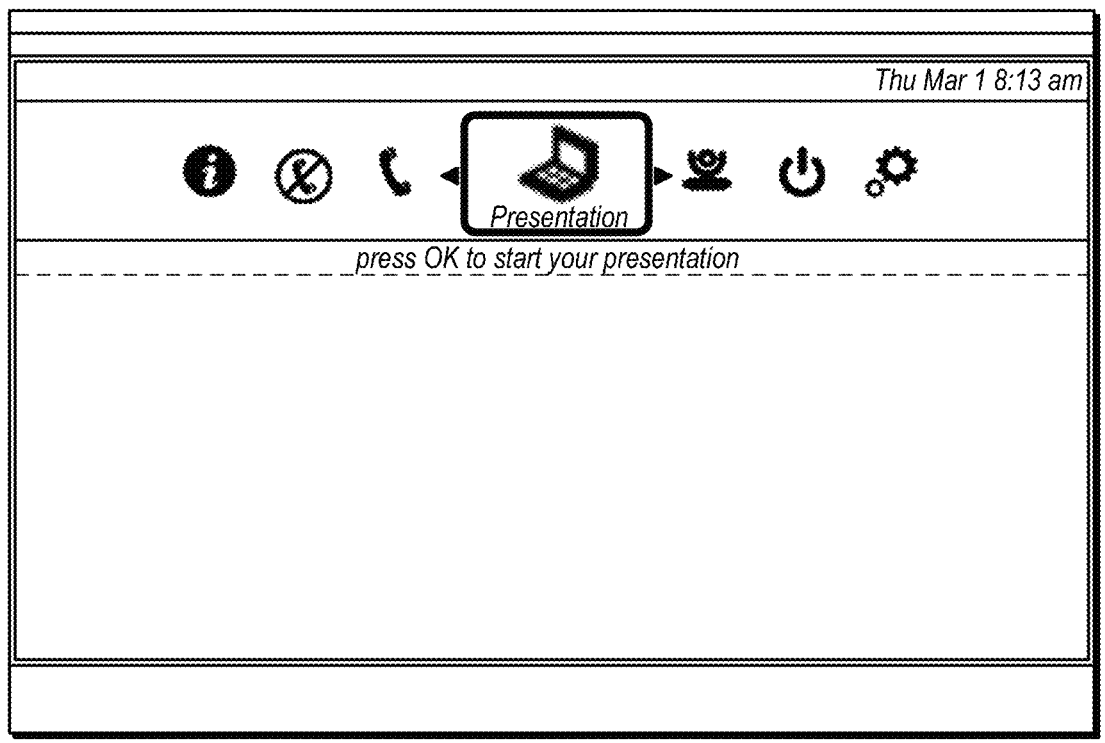
FIGS. 20A-20F illustrate exemplary interfaces corresponding to FIG. 19, according to one embodiment.
Figure 20B:
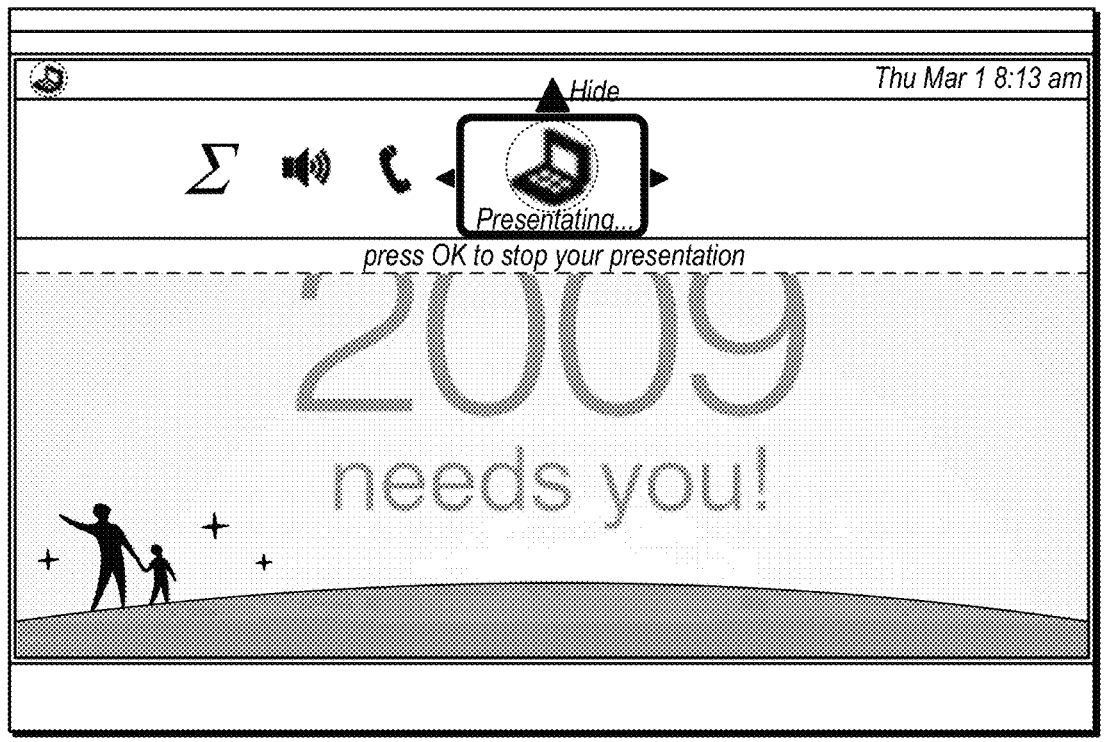

As shown in FIGS. 20A and 20B, the user initially begins a presentation. Accordingly, the currently displayed video corresponds to the presentation and does not correspond to a video camera.

Figure 20C:
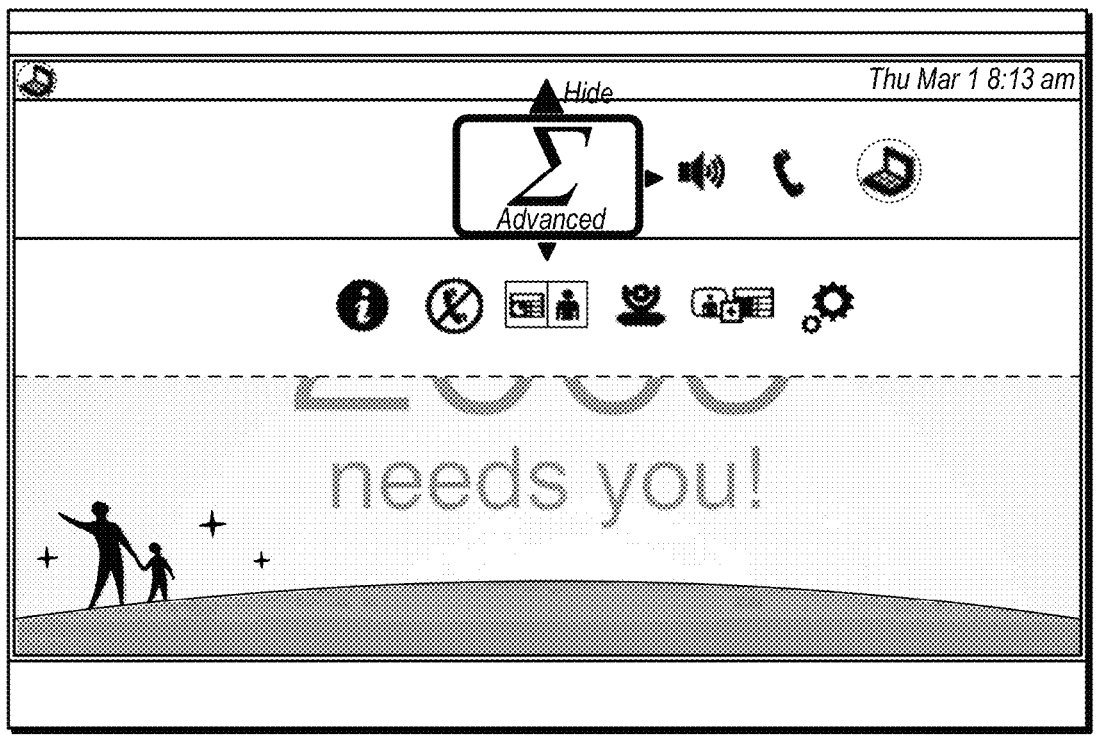
Figure 20D:
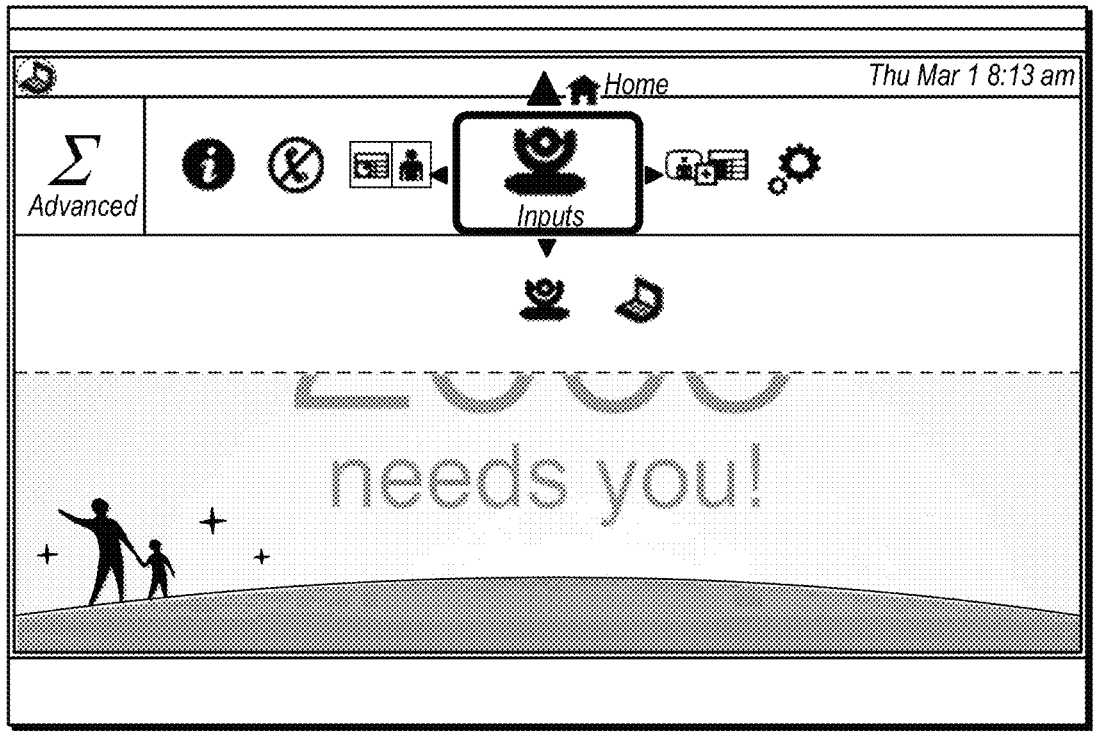
Figure 20E:
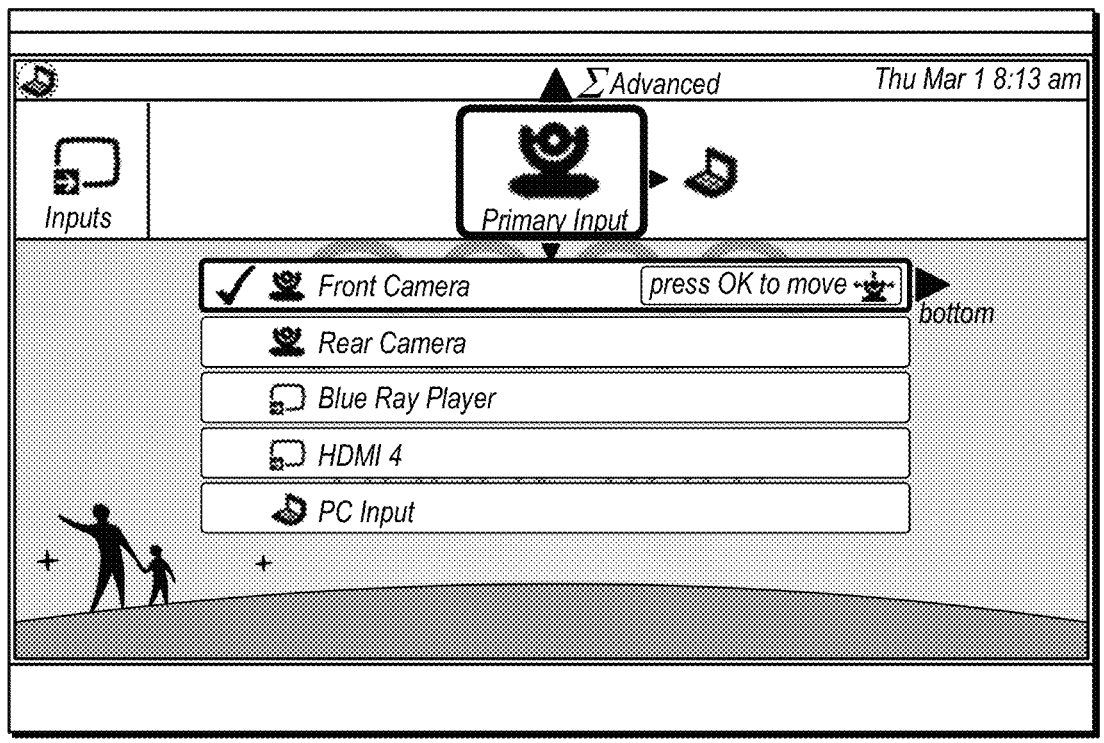

In FIG. 20C, the user has selected the advanced menu to display previous top level icons. In FIG. 20D, the user has selected the camera item from the inputs sub-menu. In FIG. 20E, the user has selected the "front camera" from the "primary input" menu to select the camera.

Figure 20F:
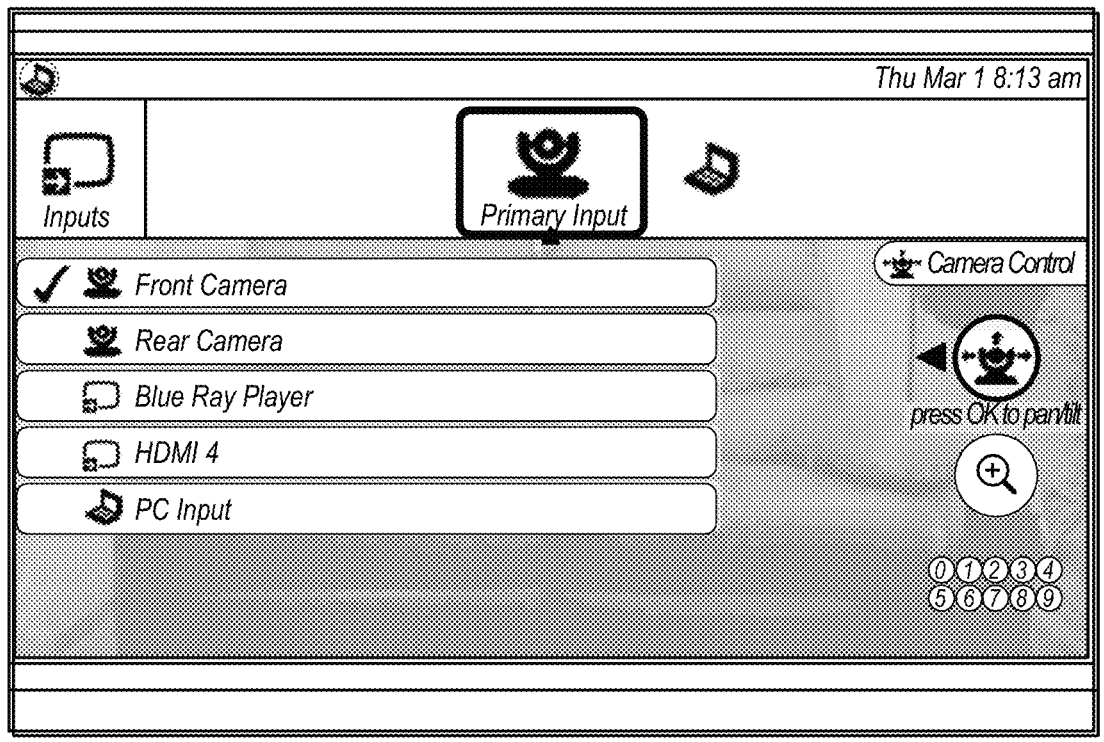

Finally, in FIG. 20F, the user is able to control the camera using camera controls. Additionally, the video of the camera is now displayed in the background instead of the presentation, which is the current active video. Accordingly, the user may use the camera controls to control the selected camera and view the changes in the video. The camera controls may operate as described in U.S. patent application Ser. No. 13/327,904, which was incorporated by reference in its entirety above. After finishing control of the camera (e.g., by returning to previous menus), the video in the background may switch back to the current active video, which, in this case, is the presentation video.

Embodiments of a subset or all (and portions or all) of the above may be implemented by program instructions stored in a memory medium or carrier medium and executed by a processor.

In some embodiments, a computer system at a respective participant location may include a memory medium(s) on which one or more computer programs or software components according to one embodiment of the present invention may be stored. For example, the memory medium may store one or more programs that are executable to perform the methods described herein. The memory medium may also store operating system software, as well as other software for operation of the computer system.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method for providing a context sensitive user interface, comprising:
   at a first time, a device entering a sleep mode;
   the device receiving user input to exit the sleep mode;
   the device exiting the sleep mode in response to receiving the user input to exit the sleep mode;
   the device determining a context from among a plurality of possible contexts in response to exiting the sleep mode, wherein on at least one occasion, determining the context comprises determining that the device is able to rejoin a previously joined videoconference after exiting the sleep mode;
   the device providing signals to display a first row of icons on a display, wherein each of the icons is selectable to perform a function;
   the device determining a first icon of the first row of icons based on the context, wherein different icons are selected for different contexts of the plurality of possible contexts, and wherein on the at least one occasion, the first icon corresponds to rejoining the previously joined videoconference; and
   based on determining the first icon based on the context, the device providing signals to display an element selection item that visually indicates a current selectable icon, wherein the element selection item visually indicates the first icon of the first row of icons.

2. The method of claim 1, further comprising:
   receiving user input to enter the sleep mode;
   wherein said entering the sleep mode is performed in response to the user input.

3. The method of claim 1, wherein said determining the context comprises determining that the device is in a "do not disturb" mode, wherein the first icon corresponds to exiting the "do not disturb" mode.

4. The method of claim 1, wherein the device comprises a videoconferencing unit, and wherein the first icon to rejoin the previously joined videoconference remains present for a threshold period of time and then disappears after the threshold period of time has been reached.

5. The method of claim 1, wherein the device comprises a videoconferencing unit, wherein said determining the context comprises determining that a time of a scheduled videoconference is proximate to the current time, wherein the first icon corresponds to joining the scheduled videoconference.

6. The method of claim 1, wherein said determining the context comprises determining that the device is in a first mode, wherein the first icon corresponds to exiting the first mode.

7. The method of claim 1, wherein said determining the context comprises determining that the device is not in one of a plurality of modes, wherein the first icon corresponds to a default icon.

8. The method of claim 1, wherein the device comprises a videoconferencing unit, wherein the first row of icons correspond to functions of a videoconferencing unit.

9. The method of claim 1, wherein the user input is received via a remote control device, wherein the remote control device is a simple remote control device, comprising:
   directional inputs for up, down, left, and right; and
   confirmation input for confirming a selection.

10. A non-transitory, computer accessible memory medium storing program instructions for providing a context sensitive user interface, wherein the program instructions are executable by a processor of a device to:
- at a first time, enter a sleep mode;
- receive user input to exit the sleep mode;
- exit the sleep mode in response to the user input to exit the sleep mode;
- determine a context from among a plurality of possible contexts in response to exiting the sleep mode, wherein on at least one occasion, to determine the context, the program instructions are further executable to determine that the device is able to rejoin a previously joined videoconference after exiting the sleep mode;
- provide signals to display a first row of icons on a display, wherein each of the icons is selectable to perform a function;
- determine a first icon of the first row of icons based on the context, wherein different icons are selected for different contexts of the plurality of possible contexts, and wherein on the at least one occasion, the first icon corresponds to rejoining the previously joined videoconference; and
- provide signals to display an element selection item that visually indicates a current selectable icon, wherein the element selection item visually indicates the first icon of the first row of icons.

11. The non-transitory, computer accessible memory medium of claim 10, wherein the program instructions are further executable to:
- receive user input to enter the sleep mode;
- wherein the program instructions are further executable to enter the sleep mode in response to the user input.

12. The non-transitory, computer accessible memory medium of claim 10, wherein the device comprises a videoconferencing unit, and wherein the first icon to rejoin the previously joined videoconference remains present for a threshold period of time and then disappears after the threshold period of time has been reached.

13. The non-transitory, computer accessible memory medium of claim 10, wherein the device comprises a videoconferencing unit, wherein to determine the context, the program instructions are further executable to determine that a time of a scheduled videoconference is proximate to the current time, wherein the first icon corresponds to joining the scheduled videoconference.

14. The non-transitory, computer accessible memory medium of claim 10, wherein to determine the context, the program instructions are further executable to determine that the device is in a first mode, wherein the first icon corresponds to exiting the first mode.

15. The non-transitory, computer accessible memory medium of claim 10, wherein to determine the context, the program instructions are further executable to determine that the device is not in one of a plurality of modes, wherein the first icon corresponds to a default icon.

16. The non-transitory, computer accessible memory medium of claim 10, wherein the device comprises a videoconferencing unit, wherein the first row of icons correspond to functions of a videoconferencing unit.

17. The non-transitory, computer accessible memory medium of claim 10, wherein the user input is received via a remote control device, wherein the remote control device is a simple remote control device, comprising:
- directional inputs for up, down, left, and right; and
- confirmation input for confirming a selection.

18. A videoconferencing system, comprising:
- a videoconferencing unit at a participant location;
- at least one display coupled to the videoconferencing unit, wherein the at least one display is configured to provide video corresponding to other participant locations during a videoconference;
- at least one audio output coupled to the videoconferencing unit, wherein the at least one audio output is configured to provide audio corresponding to the other participant locations during the videoconference;
- at least one video input coupled to the videoconferencing unit, wherein the at least one video input is configured to capture video of the participant location for provision to the other participant locations;
- at least one audio input coupled to the videoconferencing unit, wherein the at least one audio input is configured to capture audio of the participant location for provision to the other participant locations;
- wherein the videoconference unit is configured to:
  - at a first time, enter a sleep mode;
  - receive user input to exit the sleep mode;
  - exit the sleep mode in response to the user input to exit the sleep mode;
  - determine a context from among a plurality of possible contexts in response to exiting the sleep mode, wherein on at least one occasion, to determine the context, the videoconference unit is further configured to determine that the videoconference unit is able to rejoin a previously joined videoconference after exiting the sleep mode;
  - display a first row of icons on the at least one display, wherein each of the icons is selectable to perform a function;
  - determine a first icon of the first row of icons based on the context, wherein different icons are selected for different contexts of the plurality of possible contexts, and wherein on the at least one occasion, the first icon corresponds to rejoining the previously joined videoconference; and
  - display an element selection item on the at least one display that visually indicates a current selectable icon, wherein the element selection item visually indicates the first icon of the first row of icons.

19. The videoconferencing system of claim 18, wherein the first icon to rejoin the previously joined videoconference remains present for a threshold period of time and then disappears after the threshold period of time has been reached.

20. The videoconferencing system of claim 18, wherein to determine the context, the videoconference unit is further configured to determine that a time of a scheduled videoconference is proximate to the current time, wherein the first icon corresponds to joining the scheduled videoconference.

* * * * *